United States Patent
Sagara et al.

(10) Patent No.: US 10,689,536 B2
(45) Date of Patent: Jun. 23, 2020

(54) INK, IMAGE FORMING METHOD, IMAGE FORMING APPARATUS, AND IMAGE FORMED PRODUCT

(71) Applicants: Amika Sagara, Tokyo (JP); Hidetoshi Fujii, Kanagawa (JP); Michihiko Namba, Kanagawa (JP); Hiroaki Takahashi, Kanagawa (JP); Kiminori Masuda, Tokyo (JP)

(72) Inventors: Amika Sagara, Tokyo (JP); Hidetoshi Fujii, Kanagawa (JP); Michihiko Namba, Kanagawa (JP); Hiroaki Takahashi, Kanagawa (JP); Kiminori Masuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 365 days.

(21) Appl. No.: 15/051,869

(22) Filed: Feb. 24, 2016

(65) Prior Publication Data

US 2016/0264807 A1 Sep. 15, 2016

(30) Foreign Application Priority Data

Mar. 13, 2015 (JP) .................................. 2015-050573
Jun. 4, 2015 (JP) .................................. 2015-113845
Sep. 14, 2015 (JP) .................................. 2015-180658

(51) Int. Cl.
*C09D 11/38* (2014.01)
*C09D 11/102* (2014.01)
(Continued)

(52) U.S. Cl.
CPC ............ *C09D 11/38* (2013.01); *C09D 11/102* (2013.01); *C09D 11/322* (2013.01); *B41M 5/0023* (2013.01)

(58) Field of Classification Search
CPC ........................................................ C09D 11/30
See application file for complete search history.

(56) References Cited

U.S. PATENT DOCUMENTS

2002/0175983 A1* 11/2002 Ishikawa ................ C09D 11/30
347/100
2003/0103129 A1* 6/2003 Tanaka .................... C09D 11/30
347/105
(Continued)

FOREIGN PATENT DOCUMENTS

JP 2008-019287 1/2008
JP 2008-222905 9/2008
(Continued)

OTHER PUBLICATIONS

Pubchem data sheet. 3-aminopropanol. https://pubchem.ncbi.nlm.nih.gov/compound/3-Aminopropanol. (Obtained Mar. 21, 2018).*
(Continued)

*Primary Examiner* — Scott R. Walshon
*Assistant Examiner* — Sathavaram I Reddy
(74) *Attorney, Agent, or Firm* — Oblon, McClelland, Maier & Neustadt, L.L.P.

(57) ABSTRACT

An ink is provided. The ink includes a colorant, an organic solvent, a resin particle including an anionic urethane resin, and an organic amine compound having a boiling point in the range of from 120° C. to 200° C. and a molecular weight of 100 or less, and water, and the mass ratio of the organic amine compound to the resin particle is in the range of from 0.01 to 1.00.

15 Claims, 4 Drawing Sheets

(51) Int. Cl.
 *C09D 11/322* (2014.01)
 *B41M 5/00* (2006.01)

(56) References Cited

U.S. PATENT DOCUMENTS

| | | | |
|---|---|---|---|
| 2006/0112853 A1* | 6/2006 | Ham | C09D 11/037 106/31.78 |
| 2008/0092773 A1* | 4/2008 | Matsuyama | B41J 2/17513 106/31.65 |
| 2008/0286484 A1* | 11/2008 | Tojo | C09D 11/101 427/511 |
| 2009/0043036 A1* | 2/2009 | Lee | C08L 81/08 524/457 |
| 2010/0028625 A1 | 2/2010 | Kagata et al. | |
| 2010/0216936 A1* | 8/2010 | Inushima | C09B 67/0033 524/548 |
| 2010/0245416 A1 | 9/2010 | Ohshima et al. | |
| 2012/0320137 A1 | 12/2012 | Fujii et al. | |
| 2013/0101814 A1 | 4/2013 | Gotou et al. | |
| 2013/0143008 A1 | 6/2013 | Gotou et al. | |
| 2013/0187998 A1 | 7/2013 | Ohmoto | |
| 2013/0197144 A1 | 8/2013 | Katoh et al. | |
| 2013/0307912 A1 | 11/2013 | Masuda et al. | |
| 2013/0323474 A1* | 12/2013 | Gotou | C09D 11/36 428/195.1 |
| 2014/0015912 A1* | 1/2014 | Brandstein | C09D 11/30 347/110 |
| 2014/0198160 A1 | 7/2014 | Harada et al. | |
| 2015/0079358 A1 | 3/2015 | Gotou et al. | |
| 2015/0174920 A1 | 6/2015 | Namba et al. | |
| 2015/0258796 A1 | 9/2015 | Tamai et al. | |
| 2015/0259567 A1 | 9/2015 | Tamai et al. | |
| 2015/0361282 A1 | 12/2015 | Nakagawa et al. | |
| 2015/0367667 A1 | 12/2015 | Aoai et al. | |
| 2016/0024323 A1 | 1/2016 | Tamai et al. | |

FOREIGN PATENT DOCUMENTS

| | | |
|---|---|---|
| JP | 2009-155568 | 7/2009 |
| JP | 2010-053328 | 3/2010 |
| JP | 2010-155359 | 7/2010 |
| JP | 2010-275377 | 12/2010 |
| JP | 2011-074336 | 4/2011 |
| JP | 2012-077188 | 4/2012 |
| JP | 2012-149235 | 8/2012 |
| JP | 2012-241135 | 12/2012 |
| JP | 2013-010816 | 1/2013 |
| JP | 2013-108022 | 6/2013 |
| JP | 2013-155322 | 8/2013 |
| JP | 2013-166364 | 8/2013 |
| JP | 2014-198824 | 10/2014 |

OTHER PUBLICATIONS

MSDS of monoethanolamine by Dow Chemical Company (Obtained Sep. 12, 2018).*
Office Action dated Aug. 7, 2019, in Japanese Patent Application No. 2015-180658 filed Sep. 14, 2015.

* cited by examiner

INK, IMAGE FORMING METHOD, IMAGE FORMING APPARATUS, AND IMAGE FORMED PRODUCT

CROSS-REFERENCE TO RELATED APPLICATIONS

This patent application is based on and claims priority pursuant to 35 U.S.C. § 119(a) to Japanese Patent Application Nos. 2015-050573, 2015-113845, and 2015-180658, filed on Mar. 13, 2015, Jun. 4, 2015, and Sep. 14, 2015, respectively, in the Japan Patent Office, the entire disclosure of each of which is hereby incorporated by reference herein.

BACKGROUND

Technical Field

The present disclosure relates to an ink, and an image forming method, an image forming apparatus, and an image formed product using the ink.

Description of the Related Art

Inkjet recording method is spreading rapidly these days thanks to its simplicity in recording color image and low running cost. Inks used for inkjet recording (hereinafter "inkjet inks") include an aqueous dye ink in which a dye is dissolved in an aqueous medium and a solvent ink in which an oil-soluble dye is dissolved in an organic solvent. From environmental and safety aspects, an ink in which a water-soluble dye is dissolved in water or in a combination of water and a water-soluble organic solvent is generally used at office and home. However, disadvantageously, a recorded image formed with the water-soluble-dye-containing ink is poor in terms of water resistance and light resistance.

On the other hand, an aqueous pigment ink in which fine particles of pigment are dispersed in water is attracting attention. It is known that an inkjet ink containing a water-dispersible pigment has excellent water resistance and light resistance. In the case in which an image is recorded with such a pigment ink on glossy paper, the pigment in the ink does not permeate the ink receiving layer of the glossy paper and remains on the surface of the paper forming its film. Thus, the image recorded with pigment ink on glossy paper is inferior in terms of rub resistance than that recorded with pigment ink on plain paper or with dye ink that can permeate the ink receiving layer. As the image recorded with pigment ink on glossy paper is rubbed, the ink film will be peeled off and the rubbed surface will be fouled.

SUMMARY

In accordance with some embodiments of the present invention, an ink is provided. The ink includes a colorant, an organic solvent, a resin particle including an anionic urethane resin, and an organic amine compound having a boiling point in the range of from 120° C. to 200° C. and a molecular weight of 100 or less, and water, and the mass ratio of the organic amine compound to the resin particle is in the range of from 0.01 to 1.00.

In accordance with some embodiments of the present invention, an image forming method is provided. The method includes the steps of applying at least one stimulus selected from heat, pressure, and vibration to the above ink to fly the ink, and recording an image on a recording medium with the ink.

In accordance with some embodiments of the present invention, an image forming apparatus is provided. The apparatus includes an ink flying device and an image recorder. The ink flying device applies at least one stimulus selected from heat, pressure, and vibration to the above ink to fly the ink. The image recorder records an image on a recording medium with the ink.

In accordance with some embodiments of the present invention, an image formed product is provided. The product includes a recoding medium and an ink image on the recording medium. The ink image includes a colorant, an anionic urethane resin, and an organic amine compound having a boiling point in the range of from 120° C. to 200° C. and a molecular weight of 100 or less, and the mass ratio of the organic amine compound to the anionic urethane resin is in the range of from 0.01 to 1.00.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
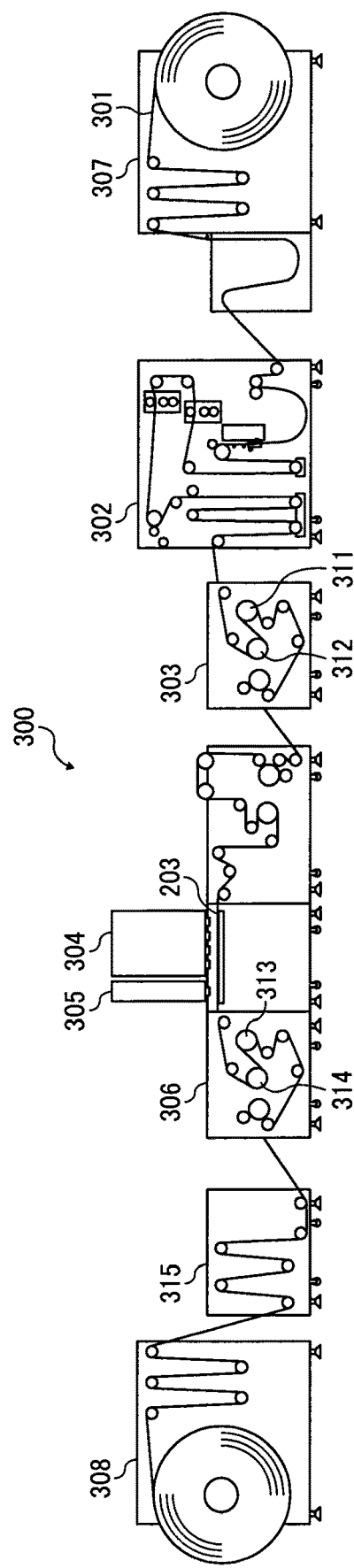
FIG. 1 is a schematic view of an inkjet image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

To give good rub resistance to an image recorded on glossy paper, there has been a proposal to include a resin in inkjet inks. However, in this case, due to inclusion of the resin in the ink, the viscosity of the ink will significantly increase when moisture is evaporated from the ink. The dried ink will clog nozzles or adhere to the periphery of the nozzles, thereby causing defective discharge of the ink. Moreover, the discharged ink will undergo thickening or concretion to degrade maintainability.

In view of the above-described situation, one object of the present invention is to provide an ink which provides a good combination of rub resistance, discharge stability, and maintainability.

The inventors of the present invention have found that an ink including a combination of a urethane resin particle and a specific amine compound is capable of suppressing viscosity increase even when moisture is evaporated from the ink, while improving rub resistance. Thus, an ink having a good combination of rub resistance, discharge reliability, and maintainability is provided.

This ink is capable of recording rub-resistant images not only on plain paper but also on glossy paper while keeping discharge stability and maintainability.

The ink according to an embodiment of the present invention includes a resin particle including an anionic urethane resin. This makes the ink possible to give improved rub resistance to an image recorded on glossy paper and to provide good maintainability at the same time. This is because the urethane resin has excellent adhesiveness to base materials of recording media and high abrasion resistance. It is preferable that the particle diameter of the resin particle is as small as possible. The smaller particle diameter makes the resin particle possible to form its film filling the space between a pigment particle and a recording medium, or between pigment particles, thus providing higher rub resistance. From the viewpoint of discharge stability and storage stability of the ink, the anionic urethane resin preferably includes a polycarbonate-based urethane resin or a polyester-based urethane resin.

The ink further includes an amine compound having a boiling point of from 120° C. to 200° C. and a molecular weight of 100 or less. This makes the ink possible to suppress viscosity increase even when moisture is evaporated from the ink and to provide high discharge stability and maintainability at the same time. The amine compound having such a small molecular weight becomes a counter ion of the resin particle. Since the boiling point of the amine compound is higher than that of water, the amine compound, serving as the counter ion of the resin particle, is suppressed from being evaporated even when moisture is evaporated from the ink. Thus, the resin particle can be kept stably dispersed in the ink and the ink is suppressed from increasing its viscosity. When the mass ratio of the amine compound to the resin particle is in the range of from 0.01 to 1.00, the ink can secure storage stability while the amine compound suppresses viscosity increase of the ink when moisture is evaporated from the ink. This makes the ink possible to provide high rub resistance, discharge stability, and maintainability at the same time.

Preferably, the ink has a static surface tension in the range of from 20 to 27 mN/m at 25° C. More preferably, the ink further includes a fluorine-based surfactant and at least one of an acetylene-glycol-based surfactant represented by a formula (V) and a foam inhibitor represented by a formula (VII), to be described later. Inclusion of the surfactant and the foam inhibitor makes the ink possible to provide both high-density image on plain paper and foam inhibiting property.

Ink

Resin Particle

The ink according to an embodiment of the present invention includes a resin particle including an anionic urethane resin. This makes the ink possible to give improved rub resistance to an image recorded on glossy paper and to provide good maintainability of the ink at the same time.

The urethane resin is a reaction product of a polyisocyanate with a polyol. The urethane resin exerts the functions of both a soft segment consisting of the polyol components having weak aggregation force and a hard segment consisting of urethane bonds having high aggregation force. The soft segment is flexible and resistant to deformation, such as drawing and bending, of base materials of recording media. The hard segment has excellent adhesiveness to base materials of recording media and high abrasion resistance. The resin particle is included in the ink to give high rub resistance to the ink on glossy paper.

The urethane resin particle is water-dispersible. Preferably, the urethane resin particle is used as an O/W dispersion. The dispersion may be either a water dispersion in which the urethane resin is emulsified with an emulsifier or a water dispersion of a self-emulsifying urethane resin to which a functional group having the action of an emulsifier is introduced by copolymerization.

In particular, a water dispersion of a self-emulsifying anionic polycarbonate-based or polyester-based urethane resin is preferable, since it has excellent dispersion stability. From the viewpoint of dispersion stability and storage stability of the ink, a water dispersion of a polycarbonate-based urethane resin is more preferable.

The particle diameter (D50) of the resin particle has an effect on the viscosity of the dispersion. The viscosity becomes higher as the particle diameter becomes smaller when compared under the same solid content and the same ink composition. From the viewpoint of rub resistance of image recorded on glossy paper, the resin particle preferably has a particle diameter (D50) in the range of from 10 to 100 nm, more preferably from 10 to 50 nm. When the particle diameter (D50) of the resin particle is 10 nm or more, thickening of the ink is suppressed and storage stability is improved. Preferably, the resin particle has a particle diameter (D50) of 100 nm or less. In this case, the ink provides an image having high rub resistance which suppresses stretch of the image. More preferably, the resin particle has a particle diameter (D50) in the range of from 10 to 50 nm. In this case, the ink is capable of forming an image which will not be peeled off even after being rubbed.

The resin particle has a function of fixing the colorant on the surface of recording media. Preferably, the resin particle is capable of forming its film at room temperature to further improve fixability of the colorant. Accordingly, the resin particle preferably includes a water-dispersible resin having a minimum film-forming temperature (MFT) of 30° C. or less. When the water-dispersible resin has a glass transition temperature of −40° C. or less, the resulting film becomes so viscid that tackiness is given to the print. Therefore, the water-dispersible resin preferably has a glass transition temperature of −30° C. or more.

The content of the water-dispersible resin in the ink is preferably in the range of from 1% to 10% by mass, more preferably from 1.5% to 5% by mass. When the content is 1% by mass or more, improved rub resistance is obtained. When the content is 10% by mass or less, viscosity increase of the ink is suppressed when moisture is evaporated from the ink and good maintainability is secured.

Preferably, the mass ratio of the resin particle to the colorant is in the range of from 0.05 to 2 in the ink. When the mass ratio is 0.05 or more, fixability is secured. When the mass ratio is 2 or less, good discharge stability is secured.

Examples of the water-dispersible resin are not limited to the above-described anionic urethane resin and include other resins such as acrylic resin, styrene-acrylic resin, acrylic silicone resin, and fluorine-based resin.

Amine Compound

The ink includes an amine compound having a boiling point in the range of from 120° C. to 200° C., preferably from 130° C. to 180° C., and a molecular weight of 100 or less, preferably 90 or less. The mass ratio of the amine compound to the resin particle is in the range of from 0.01 to 1.00, preferably from 0.01 to 0.08, in the ink. This configuration makes the ink possible to provide good maintainability.

The amine compound may be any one of a primary amine, a secondary amine, a tertiary amine, a quaternary amine, and a salt thereof. The quaternary amine is a compound including a nitrogen atom to which four alkyl groups are bonded.

Preferably, the amine compound is a compound represented by the following formula (I) or (II).

(I)

In the formula (I), each of $R_1$, $R_2$, and $R_3$ independently represents a hydrogen atom, an alkoxy group having 1 to 4 carbon atoms, an alkyl group having 1 to 6 carbon atoms, or a hydroxyethyl group, but the case in which all of $R_1$, $R_2$, and $R_3$ represent a hydrogen atom is excluded.

(II)

In the formula (II), each of $R_4$, $R_5$, and $R_6$ independently represents a hydrogen atom, a methyl group, an ethyl group, a hydroxymethyl group, or an alkyl group having 1 to 4 carbon atoms.

Specific examples of the compound represented by the formula (I) or (II) include, but are not limited to, 1-amino-2-propanol, 3-amino-1-propanol, N-methylethanolamine, N,N-dimethylethanolamine, and 1-amino-2-methyl-propanol.

The content of the amine compound in the ink is not limited to a specific amount. From the viewpoint of pH adjustment of the ink, the content of the amine in the ink is preferably in the range of from 0.01% to 5% by mass, and more preferably from 0.05% to 2% by mass. The above-described amine compound can be used in combination with other amine compounds.

Organic Solvent

The ink includes an organic solvent. Preferably, the organic solvent is a polyvalent alcohol having a solubility parameter (hereinafter "SP value") in the range of from 11.8 to 14.0. Specific examples of the polyvalent alcohol having an SP value in the range of from 11.8 to 14.0 include, but are not limited to, 3-methyl-1,3-butanediol (having an SP value of 12.05), 1,2-butanediol (having an SP value of 12.75), 1,3-butanediol (having an SP value of 12.75), 1,4-butanediol (having an SP value of 12.95), 2,3-butanediol (having an SP value of 12.55), 1,2-propanediol (having an SP value of 13.48), 1,3-propanediol (having an SP value of 13.72), 1,2-hexanediol (having an SP value of 11.80), 1,6-hexanediol (having an SP value of 11.95), 3-methyl-1,5-pentanediol (having an SP value of 11.80), triethylene glycol (having an SP value of 12.12), and diethylene glycol (having an SP value of 13.02). Among these compounds, 3-methyl-1,3-butanediol (having an SP value of 12.05), 1,2-butanediol (having an SP value of 12.75), 1,3-butanediol (having an SP value of 12.75), 1,4-butanediol (having an SP value of 12.95), 2,3-butanediol (having an SP value of 12.55), 1,2-propanediol (having an SP value of 13.48), and 1,3-propanediol (having an SP value of 13.72) are preferable.

In the ink, the polyvalent alcohol can be used in combination with a wetting agent. The mass ratio of the polyvalent alcohol to the wetting agent is determined depending on the type and amount of other additives. However, the mass ratio is preferably in the range of from 10/90 to 90/10, and more preferably from 40/60 to 60/40. Specific examples of the wetting agent include, but are not limited to, polyvalent alcohols (other than the above-described polyvalent alcohol), polyvalent alcohol alkyl ethers, polyvalent alcohol aryl ethers, nitrogen-containing heterocyclic compounds, amides, amines, sulfur-containing compounds, propylene carbonate, and ethylene carbonate.

Specific examples of the polyvalent alcohols usable for the wetting agent include, but are not limited to, dipropylene glycol (having a boiling point of 232° C.), 1,5-pentanediol (having a boiling point of 242° C.), 3-methyl-1,3-butanediol (having a boiling point of 203° C.), propylene glycol (having a boiling point of 187° C.), 2-methyl-2,4-pentanediol (having a boiling point of 197° C.), ethylene glycol (having a boiling point of from 196° C. to 198° C.), tripropylene glycol (having a boiling point of 267° C.), hexylene glycol (having a boiling point of 197° C.), polyethylene glycol (in a viscous liquid state to a solid state), polypropylene glycol (having a boiling point of 187° C.), 1,6-hexanediol (having a boiling point of from 253° C. to 260° C.), 1,2,6-hexanetriol (having a boiling point of 178° C.), trimethylolethane (in a solid state, having a melting point of from 199° C. to 201° C.), and trimethylolpropane (in a solid state, having a melting point of 61° C.).

Specific examples of the polyvalent alcohol alkyl ethers include, but are not limited to, ethylene glycol monoethyl ether (having a boiling point of 135° C.), ethylene glycol monobutyl ether (having a boiling point of 171° C.), diethylene glycol monomethyl ether (having a boiling point of 194° C.), diethylene glycol monobutyl ether (having a boiling point of 231° C.), ethylene glycol mono-2-ethylhexyl ether (having a boiling point of 229° C.), and propylene glycol monoethyl ether (having a boiling point of 132° C.).

Specific examples of the polyvalent alcohol aryl ethers include, but are not limited to, ethylene glycol monophenyl ether (having a boiling point of 237° C.) and ethylene glycol monobenzyl ether.

Specific examples of the nitrogen-containing heterocyclic compounds include, but are not limited to, N-methyl-2-pyrrolidone (having a boiling point of 202° C.), 1,3-dimethyl-2-imidazolidinone (having a boiling point of 226° C.), ε-caprolactam (having a boiling point of 270° C.), and γ-butyrolactone (having a boiling point of from 204° C. to 205° C.).

Specific examples of the amides include, but are not limited to, formamide (having a boiling point of 210° C.), N-methylformamide (having a boiling point of from 199° C. to 201° C.), N,N-dimethylformamide (having a boiling point of 153° C.), and N,N-diethylformamide (having a boiling point of from 176° C. to 177° C.).

Specific examples of the amines include, but are not limited to, monoethanolamine (having a boiling point of 170° C.), diethanolamine (having a boiling point of 268° C.), triethanolamine (having a boiling point of 360° C.), N,N-dimethylmonoethanolamine (having a boiling point of 139° C.), N-methyldiethanolamine (having a boiling point of 243° C.), N-methylethanolamine (having a boiling point of 159° C.), N-phenylethanolamine (having a boiling point of from 282° C. to 287° C.), and 3-aminopropyldiethylamine (having a boiling point of 169° C.).

Specific examples of the sulfur-containing compounds include, but are not limited to, dimethylsulfoxide (having a boiling point of 139° C.), sulfolane (having a boiling point of 285° C.), and thiodiglycol (having a boiling point of 282° C.).

Preferably, the total content of the polyvalent alcohol having an SP value in the range of from 11.8 to 14.0 and the wetting agent in the ink is in the range of from 30% to 50% by mass.

When the total content is less than 30% by mass, the viscosity of the ink significantly increases when moisture is evaporated from the ink. When the total content is in excess of 50% by mass, the drying property of the ink may degrade.

Penetrant

The organic solvent may be mixed with a penetrant. The penetrant preferably includes at least one of a non-wettable polyol compound having 8 to 11 carbon atoms and a glycol ether compound.

Here, non-wettable property is defined as a property in which the solubility in water at 25° C. ranges from 0.2% to 5.0% by mass. Preferably, the penetrant is a 1,3-diol compound represented by the following formula (III). More preferably, the penetrant is 2-ethyl-1,3-hexanediol (having a solubility of 4.2% at 25° C.) or 2,2,4-trimethyl-1,3-pentanediol (having a solubility of 2.0% at 25° C.).

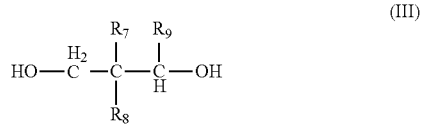

(III)

In the formula (III), $R_7$ represents a methyl group or an ethyl group, $R_8$ represents a hydrogen atom or a methyl group, and $R_9$ represents an ethyl group or a propyl group.

Specific examples of the non-wettable polyol compound include, but are not limited to, aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

The content of the penetrant in the ink is preferably in the range of from 0.5% to 5% by mass, more preferably from 1% to 3% by mass. When the content is less than 0.5% by mass, the ink cannot obtain penetrating effect and improved image quality. When the content is in excess of 5% by mass, the penetrant may be separated from the ink without being dissolved therein, resulting in undesired increase in initial viscosity of the ink.

Colorant

The colorant includes a pigment as a major component. The colorant may further include a dye for adjusting color tone without degrading fade resistance. The solid content of the colorant in the ink is preferably in the range of from 2% to 15% by mass, more preferably from 3% to 12% by mass. When the content is less than 2% by mass, color developing ability and image density of the ink may deteriorate. When the content is in excess of 15% by mass, the ink may undergo thickening to degrade discharge property. Examples of the pigment include both inorganic and organic pigments used for black-and-white or color printing.

Preferably, the colorant is in the following form (1) or (2) to exhibit water dispersibility.

Form (1): A water dispersion of fine polymer particles containing a water-insoluble or poorly-water-soluble pigment.

Form (2): A pigment (hereinafter "self-dispersible pigment") which has at least one type of hydrophilic group on its surface and exhibits water dispersibility without the presence of a dispersant.

Preferably, the water-dispersible colorant in the form (1) is a polymer emulsion of fine polymer particles containing the pigment.

In the polymer emulsion, the pigment may be either incorporated in the fine polymer particles or adsorbed to the surfaces of the fine polymer particles.

Preferably, the water-dispersible colorant may include a self-dispersible pigment (in the form (2)) or a resin-coated pigment. The self-dispersible pigment gives a higher fluidity to the ink even when moisture is evaporated from the ink. The resin-coated pigment gives a higher fixability to the ink fixed on glossy paper.

The resin-coated pigment can be obtained by coating or microcapsulating a pigment with a resin having a hydrophilic group. The resulting microcapsule of the pigment can be reliably dispersed in ink without the presence of a dispersant.

The content of the pigment originated from the colorant in the ink is preferably in the range of from 3.0% to 10.0% by mass. When the content of the pigment is less than 3.0% by mass, image density may deteriorate. When the content of the pigment is in excess of 10% by mass, discharge stability may deteriorate.

Specific examples of the resin for coating the pigment include, but are not limited to, polyamide, polyurethane, polyester, polyurea, epoxy resin, polycarbonate, urea resin, melamine resin, phenolic resin, polysaccharide, gelatin, gum arabic, dextran, casein, protein, natural rubber, carboxy polymethylene, polyvinyl alcohol, polyvinyl pyrrolidone, polyvinyl acetate, polyvinyl chloride, polyvinylidene chloride, cellulose, ethyl cellulose, methyl cellulose, nitrocellulose, hydroxyethyl cellulose, cellulose acetate, polyethylene, polystyrene, polymer or copolymer of acrylic acid and/or methacrylic acid, polymer and copolymer of acrylate and/or methacrylate, copolymer of acrylic or methacrylic acid with acrylate or methacrylate, copolymer of styrene with acrylic or methacrylic acid, copolymer of styrene with maleic acid, sodium alginate, fatty acid, paraffin, beeswax, insect wax, hardened beef tallow, carnauba wax, and albumin.

Among these materials, organic polymers having an anionic group, such as carboxylic acid group and sulfonic acid group, are preferable. Specific examples of usable nonionic organic polymers include, but are not limited to, polyvinyl alcohol, polyethylene glycol monomethacrylate, polypropylene glycol monomethacrylate, methoxypolyethylene glycol monomethacrylate and polymers or copolymers thereof, and cationic ring-opening polymerization product of 2-oxazoline. Specifically, completely-saponified products of polyvinyl alcohol are preferable since they have a low water solubility. In particular, they are easily soluble in hot water but poorly soluble in cold water.

The content of the organic polymer, which composes the wall film of the microcapsule of the resin-coated pigment, is preferably in the range of from 15% to 40% by mass. In this case, the content of the organic polymer in the microcapsule is relative low. Therefore, deterioration of color developing ability of the ink, which may be caused by the presence of the coated organic polymer, can be suppressed. When the content of the organic polymer is less than 15% by mass, the effect of microcapsulation may not be exerted. When the content is in excess of 40% by mass, color developing ability of the pigment may significantly deteriorate.

Examples of the pigment include carbon black and pigments having various colors.

Specifically, a carbon black which is produced by a furnace method or a channel method and has a primary particle diameter in the range of from 15 to 40 milli-micron, a BET specific surface area in the range of from 50 to 300 m$^2$/g, a DBP oil absorption in the range of from 40 to 150 ml/100 g, a volatile content in the range of from 0.5% to 10%, and a pH value in the range of from 2 to 9 is preferable. Specific examples of such a carbon black include, but are not limited to: No. 2300, No. 900, MCF-88, No. 33, No. 40, No. 45, No. 52, MA7, MA8, MA100, No. 2200B (available from Mitsubishi Chemical Corporation); RAVEN 700, 5750, 5250, 5000, 3500, and 1255 (available from Columbian Chemicals); REGAL 400R, 330R, and 660R, MOGUL L, and MONARCH 700, 800, 880, 900, 1000, 1100, 1300, and 1400 (available from Cabot Corporation); and COLOR BLACK FW1, FW2, FW2V, FW18, FW200, S150, S160, and S170, PRINTEX 35, U, V, 140U, 140V, and SPECIAL BLACK 6, 5, 4A, and 4 (available from Degussa AG).

Specific examples of the pigments having various colors include, but are not limited to, anthraquinone, phthalocyanine blue, phthalocyanine green, diazo, monoazo, pyranthrone, perylene, heterocyclic yellow, quinacridone, indigoid, and thioindigoid. Specific examples of the phthalocyanine blue include, but are not limited to, copper phthalocyanine blue and derivatives thereof (e.g., Pigment Blue 15). Specific examples of the quinacridone include, but are not limited to, Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Specific examples of the anthraquinone include, but are not limited to, Pigment Red 43, Pigment Red 194 (Perinone Red), Pigment Red 216 (brominated Pyranthrone Red), and Pigment Red 226 (Pyranthrone Red). Specific examples of th perylene include, but are not limited to, Pigment Red 123 (vermillion), Pigment Red 149 (scarlet), Pigment Red 179 (maroon), Pigment Red 190 (red), Pigment Violet, Pigment Red 189 (yellow-shaded red), and Pigment Red 224. Specific examples of the thioindigoid include, but are not limited to, Pigment Red 86, Pigment Red 87, Pigment Red 88, Pigment Red 181, Pigment Red 198, Pigment Violet 36, and Pigment Violet 38. Specific examples of the heterocyclic yellow include, but are not limited to, Pigment Yellow 117 and Pigment Yellow 138. Other suitable colorants are described in The Colour Index 3rd Edition, The Society of Dyes and Colourists, 1982.

When the colorant includes a self-dispersible organic pigment or a self-dispersible carbon black, the colorant has an improved dispersibility even when the content ratio of the organic polymer in the microcapsule is relatively low. Therefore, storage stability of the ink is secured.

The pigment preferably has an average particle diameter in the range of from 10 to 150 nm, more preferably from 20 to 100 nm, and most preferably from 30 to 80 nm. When the average particle diameter of the pigment is in excess of 150 nm, not only the color saturation of the printed image may lower, but also the ink may undergo thickening or aggregation when stored and may clog nozzles when printing image. When the average particle diameter of the pigment is less than 10 nm, not only light resistance but also storage stability may deteriorate.

Here, the average particle diameter is a 50% average particle diameter (D50) which can be measured with an instrument MICROTRAC UPA-150 (available from Nikki so Co., Ltd.) as follows. First, the pigment is diluted with pure water to prepare a sample liquid having a pigment concentration of 0.01% by mass. The sample liquid is subjected to a measurement using the above instrument at 23° C. while setting the particle refractive index to 1.51, the particle density to 1.4 g/cm$^3$, and the solvent parameter to a parameter of pure water.

In addition to the above-described resin-coated pigments, resin-coated dyes may also be used as the colorant. Examples of usable water-soluble dyes are described below. Preferably, dyes having excellent water resistance and light resistance are used. Specific examples of usable dyes include, but are not limited to, acid dyes and food dyes, such as: C.I. Acid Yellow 17, 23, 42, 44, 79, and 142; C.I. Acid Red 1, 8, 13, 14, 18, 26, 27, 35, 37, 42, 52, 82, 87, 89, 92, 97, 106, 111, 114, 115, 134, 186, 249, 254, and 289; C.I. Acid Blue 9, 29, 45, 92, and 249; C.I. Acid Black 1, 2, 7, 24, 26, and 94; C.I. Food Yellow 3 and 4; C.I. Food Red 7, 9, and 14; and C.I. Food Black 1 and 2.

Specific examples of usable dyes further include, but are not limited to, direct dyes such as: C.I. Direct yellow 1, 12, 24, 26, 33, 44, 50, 86, 120, 132, 142, and 144; C.I. Direct Red 1, 4, 9, 13, 17, 20, 28, 31, 39, 80, 81, 83, 89, 225, and 227; C.I. Direct Orange 26, 29, 62, and 102; C.I. Direct Blue 1, 2, 6, 15, 22, 25, 71, 76, 79, 86, 87, 90, 98, 163, 165, 199, and 202; and C.I. Direct Black 19, 22, 32, 38, 51, 56, 71, 74, 75, 77, 154, 168, and 171.

Specific examples of usable dyes further include, but are not limited to, basis dyes such as: C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Black 2 and 8.

Specific examples of usable dyes further include, but are not limited to, reactive dyes such as: C.I. Reactive Black 3, 4, 7, 11, 12, and 17; C.I. Reactive Yellow 1, 5, 11, 13, 14, 20, 21, 22, 25, 40, 47, 51, 55, 65, and 67; C.I. Reactive Red 1, 14, 17, 25, 26, 32, 37, 44, 46, 55, 60, 66, 74, 79, 96, and 97; and C.I. Reactive Blue 1, 2, 7, 14, 15, 23, 32, 35, 38, 41, 63, 80, and 95.

The microcapsulation process in which a water-insoluble pigment is coated with an organic polymer can be performed by any known method. For example, chemical methods, physical methods, physicochemical methods, and mechanical methods can be employed. More specifically, interfacial polymerization method, in-situ polymerization method, liquid cured film formation method, coacervation (phase separation) method, liquid drying method, fusion distribution cooling method, air suspension coating method, spray drying method, acid deposition method, and phase-transfer emulsification method can be employed.

The interfacial polymerization method is a method in which each of two types of monomers or reactants is independently dissolved in a dispersing phase or a continuous phase, and the monomers or reactants are subjected to a reaction at the interface therebetween, to form a wall film. The in-situ polymerization method is a method in which one of a continuous phase and a core particle phase is supplied with a liquid or gaseous monomer and a catalyst, or two types of reactive substances, to cause a reaction, to form a wall film. The liquid cured film formation method is a method in which droplets of a polymer solution containing core material particles are insolubilized in liquid by action of a curing agent, to form a wall film. The coacervation (phase separation) method is a method in which a polymer dispersion liquid in which core material particles are dispersed is separated into a coacervate (concentrated phase) having a high polymer concentration and a dilute phase, to form a wall film. The liquid drying method is a method in which a dispersion liquid in which a core material is dispersed in a solution dissolving a wall film material is poured in a liquid which is non-miscible with the continuous phase of the dispersion liquid to prepare a composite emulsion, and the medium of the solution dissolving the wall film material is gradually removed from the composite emulsion, to form a wall film. The fusion distribution cooling method is a method in which a wall film material which melts and liquefies by heat and solidifies at normal temperature is heated to liquefy, and core material particles are dispersed in the resulting liquid, microparticulated, and cooled, to form a wall film. The air suspension coating method is a method in which powdery core material particles are suspended in the air by a fluidized bed and allowed to float in an airflow, and a coating liquid of a wall film material is mixed therewith by atomization, to form a wall film. The spray drying method is a method in which an undiluted capsulation solution is atomized and brought into contact with hot air to evaporate volatile components, to form a wall film. The acid deposition method is a method in which an organic polymer having anionic groups is given water solubility by neutralizing at least part of the anionic groups with a basic compound and kneaded with a colorant in an aqueous medium, the kneaded product is neutralized or acidified with an acidic compound to allow the organic polymer to deposit and adhere to the colorant, and then the colorant is neutralized and dispersed. The phase-transfer emulsification method is a method in which water is poured in an organic solvent phase that is a mixture of a water-dispersible anionic organic polymer and a colorant, or the organic solvent phase is poured in water.

Preferably, a suitable microcapsulation method is selected depending on the type of the organic polymer in use. The interfacial polymerization method is suitable for polyester, polyamide, polyurethane, polyvinyl pyrrolidone, and epoxy resin. The in-situ polymerization method is suitable for polymer or copolymer of acrylate and/or methacrylate, copolymer of acrylic or methacrylic acid with acrylate or methacrylate, copolymer of styrene with acrylic or methacrylic acid, polyvinylidene chloride, polyvinylidene chloride, and polyamide. The liquid hardening method is suitable for sodium alginate, polyvinyl alcohol, gelatin, albumin, and epoxy resin. The coacervation method is suitable for gelatin, cellulose, and casein. In addition to the above-described methods, any known capsulation method can be employed to obtain a fine and uniform microcapsulated pigment.

In the case in which the phase-transfer method or the acid deposition method is employed as the microcapsulation method, an anionic organic polymer is used for the wall film material of the microcapsule.

The phase-transfer emulsification method is a microcapsulation method that causes self dispersion (phase-transfer emulsification) in which: water is poured in an organic solvent phase that is a composite of a carbon black and an anionic organic polymer which is self-dispersible or soluble in water, or a mixture of a carbon black, a curing agent, and an anionic organic polymer; or the organic solvent phase is poured in water. The carbon black may be a self-dispersible carbon black. In the phase-transfer method, a vehicle for the ink and/or an additive may be mixed in the organic solvent phase. It is more preferable to mix a liquid medium of the ink in the organic solvent phase because a dispersion liquid for use in the ink can be directly produced.

The acid deposition method is a microcapsulation method in which a wet cake, prepared by a process in which part or all of anionic groups of an anionic-group-containing organic polymer are neutralized with a basic compound and the organic polymer is then kneaded with a colorant (e.g., carbon black) in an aqueous medium and another process in which the kneaded product is neutralized or acidified with an acidic compound to allow the anionic-group-containing organic polymer to deposit and adhere to the pigment, is microcapsulated by neutralizing part or all of the anionic groups with a basic compound. By this method, an aqueous dispersion containing an anionic microcapsulated pigment which is fine and has a high pigment content can be obtained.

Specific examples of solvents used in the microcapsulation process include, but are not limited to: alkyl alcohols such as methanol, ethanol, propanol, and butanol; aromatic hydrocarbons such as benzol, triol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve. The microcapsule prepared by the above-described method is once separated from the solvent by means of centrifugal separation or filtration and then stirred and redispersed in water and a necessary solvent to obtain the ink. Preferably, the average particle diameter of the resulting capsulated pigment is in the range of from 50 to 180 nm.

The self-dispersible pigment is a pigment to the surface of which at least one type of hydrophilic group is bonded directly or through an atomic group. The self-dispersible pigment can be reliably dispersed without the presence of a dispersant. Preferably, such a pigment having a hydrophilic group on its surface is ionic, e.g., anionically or cationically charged.

Specific examples of the anionic hydrophilic group include, but are not limited to, —COOM, —SO$_3$M, —PO$_3$HM, —PO$_3$M$_2$, —SO$_2$NH$_2$, and —SO$_2$NHCOR, wherein M represents a hydrogen atom, an alkali metal, an ammonium, or an organic ammonium, and R represents an alkyl group having 1 to 12 carbon atoms, a substituted or unsubstituted phenyl group, or a substituted or unsubstituted naphthyl group. Among these groups, —COOM or —SO$_3$M is preferably bonded to the surface of the pigment.

Such an anionically-charged pigment can be obtained by means of oxidation of pigment with sodium hypochlorite, sulfonation of pigment, or a reaction of pigment with a diazonium salt.

To the surface of a cationically-charged pigment, a hydrophilic group such as a quaternary ammonium group may be bonded.

The solid content of the water-dispersible colorant in the ink is preferably in the range of from 1% to 15% by mass, more preferably from 2% to 10% by mass. When the content is less than 1% by mass, color developing ability and image density of the ink may deteriorate. When the content is in excess of 15% by mass, the ink may undergo thickening to degrade discharge property and economic efficiency.

In addition to the resin-coated colorant (e.g., pigment, dye) and the self-dispersible pigment, a pigment dispersed in an aqueous medium by a dispersant can also be used as the colorant. When the colorant includes three types of colorants, i.e., a resin-coated colorant, a pigment dispersed in an aqueous medium by a dispersant, and a self-dispersible pigment, the total content of the pigments in the colorant is preferably in the range of from 3.0% to 10.0% by mass. When the content of the pigment is less than 3.0% by mass, image density may deteriorate. When the content of the pigment is in excess of 10% by mass, discharge stability may deteriorate.

Specific examples of the dispersant include, but are not limited to, polymer dispersant and surfactant. To improve dispersion stability of the pigment when stored, the dispersant preferably includes an alkali metal salt and/or an organic basic salt of a naphthalenesulfonic acid formalin condensate as a major component.

Examples of the polymer dispersant include water-soluble resins. Specific examples of the water-soluble resins include, but are not limited to, a block copolymer or random copolymer of at least two monomers selected from styrene, styrene derivatives, vinyl naphthalene derivatives, aliphatic alcohol esters of α,β-ethylene unsaturated carboxylic acids, acrylic acid, acrylic acid derivatives, maleic acid, maleic acid derivatives, itaconic acid, itaconic acid derivatives, fumaric acid, and fumaric acid derivatives. The water-soluble resin is an alkali-soluble resin that is soluble in an aqueous solution of a base. In particular, such a water-soluble resin having a weight average molecular weight in the range of from 3,000 to 20,000 is preferable since it is easy to prepare the dispersion thereof and to lower the viscosity of the dispersion.

Examples of the surfactant include nonionic, anionic, and ampholytic surfactants. Suitable surfactant is selected depending on the type of pigment or ink formula.

Specific examples of the nonionic surfactant include, but are not limited to: polyoxyethylene alkyl ethers such as polyoxyethylene lauryl ether, polyoxyethylene myristyl ether, polyoxyethylene cetyl ether, polyoxyethylene stearyl ether, and polyoxyethylene oleyl ether; polyoxyethylene alkyl phenyl ethers such as polyoxyethylene octyl phenyl ether and polyoxyethylene nonyl phenyl ether; polyoxyethylene-α-naphthyl ether; polyoxyethylene-β-naphthyl ether; polyoxyethylene monostyryl phenyl ether; polyoxyethylene distyryl phenyl ether; polyoxyethylene alkyl naphthyl ether; polyoxyethylene monostyryl naphthyl ether; and polyoxyethylene distyryl naphthyl ether. In addition, a polyoxyethylene polyoxypropylene block copolymer, in which a part of polyoxyethylene is replaced with polyoxypropylene, and a formalin condensate of an aromatic-ring-containing compound (e.g., polyoxyethylene alkyl phenyl ether) may also be used as the surfactant.

The nonionic surfactant preferably has a hydrophilic-lipophilic balance (HLB) in the range of from 12 to 19.5, more preferably from 13 to 19. When HLB is less than 12, the surfactant is poorly compatible with dispersion media to degrade dispersion stability. When HLB is in excess of 19.5, the surfactant is poorly adsorptive to pigments to degrade dispersion stability.

Specific examples of the anionic surfactant include, but are not limited to, polyoxyethylene alkyl ether sulfate, polyoxyethylene alkyl phenyl ether sulfate, polyoxyethylene monostyryl phenyl ether sulfate, polyoxyethylene distyryl phenyl ether sulfate, polyoxyethylene alkyl ether phosphate, polyoxyethylene alkyl phenyl ether phosphate, polyoxyethylene monostyryl phenyl ether phosphate, polyoxyethylene distyryl phenyl ether phosphate, polyoxyethylene alkyl ether carboxylate, polyoxyethylene alkyl phenyl ether carboxylate, polyoxyethylene monostyryl phenyl ether carboxylate, polyoxyethylene distyryl phenyl ether carboxylate, naphthalenesulfonate formalin condensate, melaminesulfonate formalin condensate, dialkyl sulfosuccinate, alkyl disulfosuccinate, polyoxyethylene alkyl disulfosuccinate, alkyl sulfoacetate, α-olefin sulfonate, alkylbenzene sulfonate, alkylnaphthalene sulfonate, alkyl sulfonate, N-acyl amino acid salt, acyl peptide, and soap.

Surfactant

In accordance with some embodiments of the present invention, the ink may include a surfactant.

When the ink includes a surfactant, surface tension is reduced. Therefore, the ink droplet rapidly permeates a recording medium (e.g., paper) immediately after impacted on the recording medium, thus suppressing the occurrence of feathering and color bleeding.

Surfactants are categorized into nonionic surfactants, anionic surfactants, and ampholytic surfactants, depending on the polarity of their hydrophilic group.

Surfactants are also categorized into fluorine-based surfactants, silicone-based surfactants, and acetylene-based surfactants, depending on the structure of their hydrophobic group.

Among these surfactants, fluorine-based surfactants are preferable. A combination of a fluorine-based surfactant with a silicone-based surfactant and/or an acetylene-based surfactant is also preferable.

A combination of a fluorine-based surfactant and an acetylene-glycol-based surfactant is more preferable. When the ink includes such surfactants, defoaming property becomes poor. However, thanks to combination use of surfactants, foaming property becomes less effective and surface tension is reduced.

When the surfactant is included in the ink as a penetrant, the content of the surfactant in the ink is preferably in the range of from 0.05% to 5% by mass, and more preferably from 0.1% to 3% by mass.

Specific examples of the fluorine-based surfactants include, but are not limited to, perfluoroalkyl sulfonate, perfluoroalkyl carboxylate, perfluoroalkyl phosphate, perfluoroalkyl ethylene oxide adduct, perfluoroalkyl betaine, and perfluoroalkyl amine oxide compound.

Specific examples of commercially-available fluorine-based surfactants include, but are not limited to: SURFLON S-111, S-112, S-113, S-121, S-131, S-132, S-141, S-144, and S-145 (available from AGC Seimi Chemical Co., Ltd.); Fluorad™ FC-93, FC-95, FC-98, FC-129, FC-135, FC-170C, FC-430, FC-431, and FC-4430 (available from 3M); MEGAFACE F-470, F-1405, and F-474 (available from DIC Corporation); Zonyl® FS-300, FSN, FSN-100, FSO, and FSO-100 (available from E. I. du Pont de Nemours and Company); EFTOP EF-351, 352, 801, and 802 (available from Mitsubishi Materials Electronic Chemicals Co., Ltd.); FT-205 and 251 (available from NEOS COMPANY LIMITED); and PF-151N, PF-136A, and PF-156A (available from OMNOVA Solutions Inc.).

Among these surfactants, Zonyl® FSO, FSO-100, FSN, FSN-100, and FS-300 (available from E. I. du Pont de Nemours and Company) are preferable in terms of printing quality and storage stability.

Specific examples of the nonionic surfactants include, but are not limited to, polyol, glycol ether, polyoxyethylene alkyl ether, polyoxyethylene polyoxypropylene alkyl ether, polyoxyethylene alkyl ester, polyoxyethylene sorbitan fatty acid ester, polyoxyethylene alkyl phenyl ether, polyoxyethylene alkylamine, polyoxyethylene alkylamide, and acetylene glycol.

Specific examples of the anionic surfactants include, but are not limited to, acetate, dodecylbenzene sulfonate, and laurate of polyoxyethylene alkyl ether, and polyoxyethylene alkyl ether sulfate.

Specific examples of the silicone-based surfactants include, but are not limited to, polyether-modified silicone compounds. The polyether-modified silicone compounds are categorized into: a side-chain type (pendant-type) that is a polysiloxane having a polyether group on a side chain thereof; a one-end type that is a polysiloxane having a terminal polyether group on one end thereof; a both-ends type (ABA type) that is a polysiloxane having terminal polyether groups on both ends thereof; a side-chain-and-both-ends type that is a polysiloxane having polyether groups on both ends and a side chain thereof; an ABn type that is a combined polysiloxane in which a polysiloxane (A) and another polysiloxane (B) are repeatedly bonded; and a branched type that is a branched polysiloxane having a terminal polyether group on the branched end thereof.

Among these types, the side-chain type (pendant-type) that is a polysiloxane having a polyether group on a side chain thereof is preferable.

Specific examples of commercially-available silicone-based surfactants include, but are not limited to: KF-351A, KF-352A, KF-353, KF-354L, KF-355A, KF-615A, KF-945, KF-618, KF-6011, KF-6015, and KF-6004 (available from Shin-Etsu Chemical Co., Ltd.); SF-3771, SF-8427, SF-8428, SH-3749, SH-8400, FZ-2101, FZ-2104, FZ-2118, FZ-2203, FZ-2207, and L-7604 (available from Dow Corning Toray Co., Ltd.); and BYK-345, BYK-346, and BYK-348 (available from BYK Japan KK).

Specific examples of the acetylene-based surfactants include, but are not limited to, acetylene-glycol-based surfactants and acetylene-alcohol-based surfactants. Specifically, compounds represented by the following formula (IV), (V), or (VI) are preferable.

A combination of a fluorine-based surfactant and an acetylene-glycol-based surfactant represented by the formula (V) is more preferable. When a fluorine-based surfactant and an acetylene-glycol-based surfactant represented by the formula (V) are used in combination, the ratio of the surfactant represented by the formula (V) to the fluorine-based surfactant is preferably 1.50 or less.

FORMULA (IV)

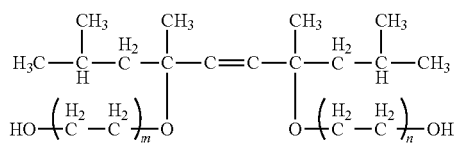

In the formula (IV), each of m and n independently represents an integer of 1 or more.

FORMULA (V)

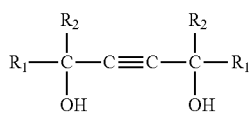

In the formula (V), each of R1 and R2 independently represents an alkyl group.

FORMULA (VI)

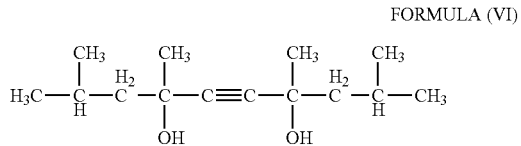 [SMILES: CC(C)CC(C)(O)C#CC(C)(O)CC(C)C]

Specific examples of commercially-available acetylene-glycol-based surfactants and acetylene-alcohol-based surfactants include, but are not limited to: Dynol® 604 and Dynol® 607 (available from Air Products and Chemicals, Inc.); Surfynol® 104, Surfynol® 420, Surfynol® 440, and Surfynol® SE (available from Nissin Chemical industry Co., Ltd.); and OLFINE 1004, OLFINE 1010, OLFINE EXP. 4001, OLFINE EXP. 4200, OLFINE EXP 4051F, and OLFINE EXP 4123 (available from Nissin Chemical Industry Co., Ltd.)

Other Components

The ink may further include other components such as a pH adjuster, a foam inhibitor (defoamer), an antiseptic antifungal agent, a chelate agent, an antirust, an antioxidant, an ultraviolet absorber, an oxygen absorber, and/or a photostabilizer, if needed.

Foam Inhibitor

The foam inhibitor in a slight amount may be added to the ink for the purpose of suppressing bubble formation. Here, the bubble formation refers to a phenomenon in which a liquid formed into a thin film encloses the air. The properties of the ink, such as surface tension and viscosity, take part in the bubble formation. A liquid having a high surface tension, such as water, is unlikely to cause bubble formation owing to the action of force for minimizing the surface area of the liquid. On the other hand, a highly-viscous and highly-permeable ink is likely to cause bubble formation since the surface tension is low. The generated bubbles are likely to maintain owing to the viscosity of the ink.

A foam inhibitor generally destroys bubbles by locally reducing the surface tension of the bubble film. Alternatively, a foam inhibitor which is insoluble in a bubbled liquid destroys bubbles by being scattered on the surface of the bubbled liquid. When the fluorine-based surfactant, having a very strong function of reducing surface tension, is included in ink, the former foam inhibitor cannot locally reduce the surface tension of the bubble film based on the above-described mechanism. Therefore, in this case, the latter foam inhibitor which is insoluble in a bubbled liquid is used, while degrading the stability of ink.

On the other hand, a foam inhibitor represented by the following formula (VII) has a high compatibility with the fluorine-based surfactant, although the function of reducing surface tension is not as strong as that of the fluorine-based surfactant. Such a foam inhibitor can be effectively incorporated into the bubble film. Due to the difference in surface tension between the fluorine-based surfactant and the foam inhibitor, the surface of the bubble film becomes locally imbalanced and the bubbles are destroyed.

In the present embodiment, a compound represented by the following formula (VII) is preferably used as the foam inhibitor. Preferably, the ratio of the compound represented by the formula (VII) to the fluorine-based surfactant is 1.00 or less.

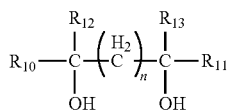

FORMULA (VII)

In the formula (VII), each of $R_{10}$ and $R_{11}$ independently represents an alkyl group having 3 to 6 carbon atoms, each of $R_{12}$ and $R_{13}$ independently represents an alkyl group having 1 to 2 carbon atoms, and n represents an integer of from 1 to 6.

Specific examples of the compound represented by the formula (VII) include, but are not limited to, 2,4,7,9-tetramethyldecane-4,7-diol and 2,5,8,11-tetramethyldodecane-5,8-diol. In particular, 2,4,7,9-tetramethyldecane-4,7-diol is preferable since it has not only foam inhibiting ability but also has an effect of improving wettability.

The content of the foam inhibitor in the ink is preferably in the range of from 0.01% to 10% by mass, more preferably from 0.1% to 5% by mass. When the content of the foam inhibitor is less than 0.01% by mass, foam inhibiting effect may not be obtained. When the content of the foam inhibitor is in excess of 10% by mass, foam inhibiting effect reaches the plateau to adversely affect the ink properties such as viscosity and particle diameter.

The pH adjuster is not limited to a specific material so tong as it can adjust the pH of the ink within the range of from 7 to 11 without adversely affecting the ink. Specific examples of the pH adjuster include, but are not limited to, alcohol amines, alkali metal hydroxides, ammonium hydroxides, phosphonium hydroxides, and alkali metal carbonates. When the pH is less than 7 or in excess of 11, inkjet head and/or ink supply unit may be dissolved out in large amounts, thereby causing alternation, leakage, and defective discharge of the ink.

Specific examples of the alcohol amines include, but are not limited to, diethanolamine, triethanolamine, and 2-amino-2-ethyl-1,3-propanediol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide. Specific examples of the phosphonium hydroxides include, but are not limited to, quaternary phosphonium hydroxide.

Specific examples of the alkali metal carbonates include, but are not limited to, lithium carbonate, sodium carbonate, and potassium carbonate.

Specific examples of the antiseptic antifungal agent include, but are not limited to, sodium dehydroacetate, sodium sorbate, 2-pyridinethiol-1-oxide sodium, sodium benzoate, and pentachlorophenol sodium.

Specific examples of the chelate agent include, but are not limited to, ethylenediaminetetraacetic acid tetrasodium salt, nitrilotriacetic acid tri sodium salt, hydroxyethylethylenediaminetriacetic acid trisodium salt, diethylenetriaminepentaacetic acid pentasodium salt, and uramildiacetic acid disodium salt.

Specific examples of the antirust include, but are not limited to, acid sulphite, sodium thiosulfate, ammonium thiodiglycolate, diisopropyl ammonium nitrite, pentaerythritol tetranitrate, and dicyclohexlyammonium nitrite.

Specific examples of the antioxidant include, but are not limited to, phenol-based antioxidants (including hindered-phenol-based antioxidants), amine-based antioxidants, sulfur-based antioxidants, and phosphor-based antioxidants.

Specific examples of the phenol-based antioxidants (including hindered-phenol-based antioxidants) include, but are not limited to, butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphanol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetrakisspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Specific examples of the amine-based antioxidants include, but are not limited to, phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butyl hydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-hydroxyphenyl)propionate]methane, and 1,1,3-tris(2-methyl-4-hydroxy-5-tert-butylphenyl)butane.

Specific examples of the sulfur-based antioxidants include, but are not limited to, dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, and dilauryl sulfide.

Specific examples of the phosphor-based antioxidants include, but are not limited to, triphenyl phosphite, octadecyl phosphite, triisodecyl phosphite, trilauryl trithiophosphite, and trinonyl phenyl phosphite.

Specific examples of the ultraviolet absorber include, but are not limited to, benzophenone-based ultraviolet absorbers, benzotriazole-based ultraviolet absorbers, salicylate-based ultraviolet absorbers, cyanoacrylate-based ultraviolet absorbers, and nickel-complex-salt-based ultraviolet absorbers.

Specific examples of the benzophenone-based ultraviolet absorbers include, but are not limited to, 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Specific examples of the benzotriazole-based ultraviolet absorbers include, but are not limited to, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl) acrylate.

Specific examples of the nickel-complex-salt-based ultraviolet absorbers include, but are not limited to, nickel bis(octylphenyl)sulfide, 2,2'-thiobis(4-tert-octyl ferrate)-n-butylamine nickel (II), 2,2'-thiobis(4-tert-octyl ferrate)-2-ethylhexylamine nickel (II), and 2,2'-thiobis(4-tert-octyl ferrate) triethanolamine nickel (II).

Method for Producing Ink

The ink is produced by dispersing or dissolving the water-dispersible colorant, organic solvent, water-dispersible resin, surfactant, penetrant, water, and optional components in an aqueous medium, and further stirring and mixing them, if needed. The stirring and mixing may be performed by sand mill, homogenizer, ball mill, paint shaker, ultrasonic disperser, stirrer equipped with stirring blades, magnetic stirrer, or high-speed disperser.

Ink Properties

The ink is not limited in properties such as viscosity and surface tension.

Preferably, the ink has a viscosity in the range of from 5 to 25 mPa·s at 25° C. More preferably, the ink has a viscosity in the range of from 6 to 20 mPa·s at 25° C. When the ink viscosity is 5 mPa·s or more, print density and text quality are improved. When the ink viscosity is 25 mPa·s is less, discharge stability is secured.

The viscosity can be measured by a viscometer (e.g., RE-550L available from Toki Sangyo Co., Ltd.) at 25° C.

Preferably, the ink has a static surface tension in the range of from 20 to 35 mN/m, more preferably from 20 to 27 mN/m, at 25° C. When the static surface tension is 27 mN/m or less, the ink becomes wettable and extendable on paper, thus providing a high-density image.

In addition, the ink preferably has a dynamic surface tension of 35 mN/m or less, more preferably 33 mN/m or less, at 25° C., when the surface lifetime measured by the maximum bubble pressure method is 15 ms. When the dynamic surface tension is 35 mM/m when the surface lifetime is 15 ms, the ink becomes more wettable and permeable to general-purpose printing paper and the occurrence of beading and color bleeding is suppressed. In addition, color developing property on plain paper is improved while the occurrence of white spots is suppressed. The ink may be stored in a container such as an ink cartridge.

The ink may be preferably used for a printer including an inkjet head of any of the following types: a piezo type inkjet head in which a piezoelectric element, serving as a pressure generator for pressurizing ink in an ink flow path, deforms a vibration plate forming a wall surface of the ink flow path to vary the inner volume of the ink flow path to discharge droplets of the ink (as described in Japanese Unexamined Patent Application Publication No. 02-51734); a thermal type inkjet head in which a heat element heats an ink in an ink flow path to generate bubbles (as described in Japanese Unexamined Patent Application Publication No. 61-59911); and an electrostatic type inkjet head in which a vibration plate forming a wall surface of an ink flow path and an electrode are facing each other and an electrostatic force generated between the vibration plate and the electrode deforms the vibration plate to vary the inner volume of the ink flow path to discharge droplets of the ink (as described in Japanese Unexamined Patent Application Publication No. 06-71882).

The image formed product according to an embodiment of the present invention includes a recoding medium and an ink image formed with the above ink on the recording medium. The ink image includes a colorant, an anionic urethane resin, and an organic amine compound having a boiling point in the range of from 120° C. to 200° C. and a molecular weight of 100 or less, and a weight ratio of the organic amine compound to the anionic urethane resin is from 0.01 to 1.00.

Recording Medium

Specific examples of the recording medium include, but are not limited to, plain paper, glossy paper, special paper, clothes, film, overhead projector (OHP) transparency, and general-purpose printing paper. Each of this media can be used alone or in combination with others.

The image formed product has high image quality without blurring and excellent temporal stability. The image formed product can be used for various purposes such as a material for recording texts and/or images.

Image Forming Method and Image Forming Apparatus

The image forming method according to an embodiment of the present invention includes an ink flying process and other optional processes such as a stimulus generating process and a control process. The image forming apparatus according to an embodiment of the present invention includes an ink flying device and other optional devices such as a stimulus generator and a controller. The image forming method is preferably performed by the image forming apparatus. The ink flying process is preferably performed by the ink flying device. The other processes are preferably performed by the other corresponding devices.

Ink Flying Process

The ink flying process is a process in which at least one stimulus (energy) selected from heat, pressure, and vibration is applied to the ink to fly the ink to a recording media. The ink flying process may be performed by any known inkjet recording method. The inkjet recording method may be of either a scanning head type or a line head type.

A recording head, serving as the ink flying device used in the ink flying process, may be either an on-demand head driven by a piezoelectric element actuator using PZT, thermal energy, or an electrostatic actuator, or a continuous injection head driven by charge control.

The image forming method may further include a drying process in which the recording medium having the ink thereon is heated to dry. The drying of the recording medium can be performed by infrared dryer, microwave dryer, roll heater, drum heater, or hot air. The image forming method may further include a fixing process in which a heater heats the image to 100° C. to 150° C. to flatten the surface of the image and to fix the image on the recording medium. The fixing process makes the image formed product have improved gloss and fixing strength. In the fixing process, a roll heater or drum heater having a heated specular surface is preferably used as a fixer. The specular surface (flat portion) of the roller heater or drum heater is brought in contact with the surface of the image. The heating temperature is preferably in the range of from 100° C. to 150° C. for balancing image quality, safety, and cost.

Details of the image forming method and the image forming apparatus are described below with reference to the drawings.

FIG. 1 is a schematic view of an inkjet image forming apparatus according to an embodiment of the present invention. An inkjet image forming includes a recording medium conveyer 301, a pretreatment part 302 in which a pretreatment liquid is applied to a recording medium 203, an image forming part 304, and an aftertreatment part 305 in which an aftertreatment liquid is applied to the recording medium having an image formed at the image forming part 304 thereon.

The recording medium conveyer 301 includes a sheet feeder 307, multiple conveyance rollers, and a winder 308. In FIG. 1, the recording medium 203 is in the form of continuous paper (rolled paper). The recording medium 203 is wound off from the sheet feeder 307 by the conveyance roller, conveyed on a platen, and winded up by the winder 308.

In the pretreatment part 302, a pretreatment liquid is applied to the recording medium 203 conveyed by the recording medium conveyer 301. Generally, if a recording medium other than paper exclusively for inkjet printing is used for inkjet image forming apparatus, various problems regarding image quality (e.g., blurring, density, color tone, bleed-through) or image toughness (e.g., water resistance, fade resistance) will arise. These problems will not arise when a pretreatment liquid having a function of aggregating ink is previously applied to the recording medium before an image is formed thereon.

In the pretreatment part 302, the pretreatment liquid is uniformly applied to the surface of the recording medium 203 by any known application method. Specific examples of usable application method include, but are not limited to, blade coating, gravure coating, gravure offset coating, bar coating, roll coating, knife coating, air knife coating, comma coating, U comma coating, AKKU coating, smoothing coating, micro gravure coating, reverse roll coating, 4-roll or 5-roll coating, dip coating, curtain coating, slide coating, and die coating.

Figure 2:
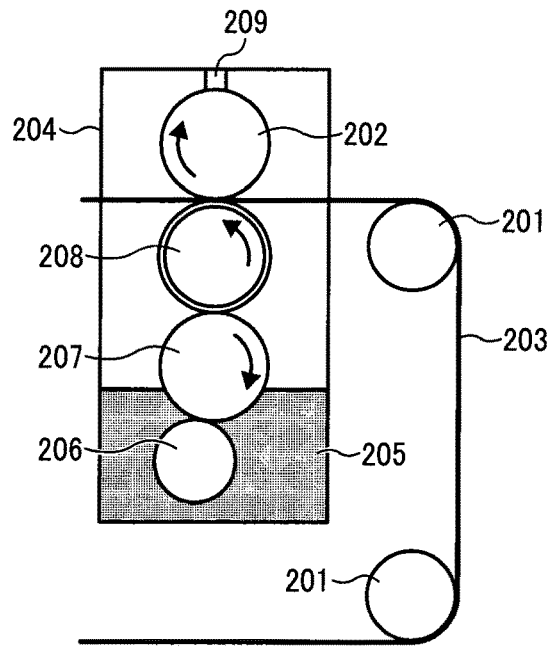
FIG. 2 is a magnified view of a pretreatment part in the inkjet image forming apparatus.

FIG. 2 is a schematic view of the pretreatment part 302. In the present embodiment, for an illustrative purpose, roll coating is employed as the pretreatment liquid application method.

Referring to FIG. 2, conveyance rollers 201 convey the recording medium 203, in the form of continuous paper, to a pretreatment liquid applicator 204. The pretreatment liquid applicator 204 retains a pretreatment liquid 205. The pretreatment liquid 205 is transferred onto a surface of an application roller 208 while being formed into a thin film, via a stirring supply roller 206 and a transfer-film-thinning roller 207.

The application roller 208 rotates while being pressed against a platen roller 202 that is rotating. The recording medium 203 passes through between the application roller 208 and the platen roller 202 so that the pretreatment liquid 205 is applied to the surface of the recording medium 203.

The nip pressure of the platen roller 202 at the time of applying the pretreatment liquid 205 to the recording medium 203 is adjustable by a pressure adjuster 209. The application amount of the pretreatment liquid 205 varies in accordance with variation in the nip pressure. The application amount is also adjustable by varying the rotation speed of the application roller 208 and the platen roller 202. The application roller 208 and the platen roller 202 are driven by a power source (e.g., driving motor). The rotation speeds of the application roller 208 and the platen roller 202 vary in accordance with variation in the energy from the power source, to adjust the application amount.

Such a method of applying the pretreatment liquid 205 to a recording area on the recording medium 203 by the application roller 208 has an advantage over a method in which the pretreatment liquid 205 is sprayed to the recording medium 203 by an injection head. This is because this process makes it possible to form the pretreatment liquid 205, even having a relatively high viscosity, into a thin film on the recording medium 203 to suppress the occurrence of image blurring.

A post-pretreatment drying part 303 may be disposed on a downstream side from the pretreatment part 302, as illustrated in FIG. 1.

The post-pretreatment drying part 303 includes heat rollers 311 and 312. The recording medium 203 to which the pretreatment liquid 205 has been applied is conveyed to the heat rollers 311 and 312 by conveyance rollers. The heat rollers 311 and 312 are heated to a high temperature in the range of from 50° C. to 100° C. Thus, upon contact of the heat rollers 311 and 312 with the recording medium 203 to which the pretreatment liquid 205 has been applied, moisture is evaporated from the recording medium 203 by transmission of heat, thus drying the recording medium 203. The configuration of the post-pretreatment drying part 303 is not limited to the above-described configuration. The post-pretreatment drying part 303 may include infrared dryer, microwave dryer, hot air device, or a combination thereof (e.g., a combination of heat roller and hot air device). It is also possible to preheat the recording medium 203 before the pretreatment liquid 205 is applied thereto.

In the image forming part 304 disposed downstream from the pretreatment part 302, an image is formed on the recording medium 203 in accordance with image data.

Figure 3:
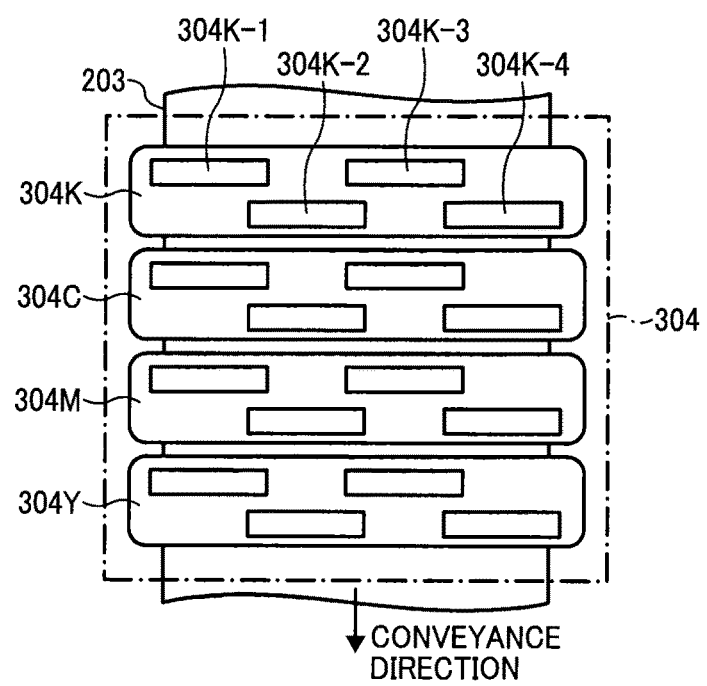
FIG. 3 is a schematic view of a droplet discharge head in the inkjet image forming apparatus.
Figure 4:
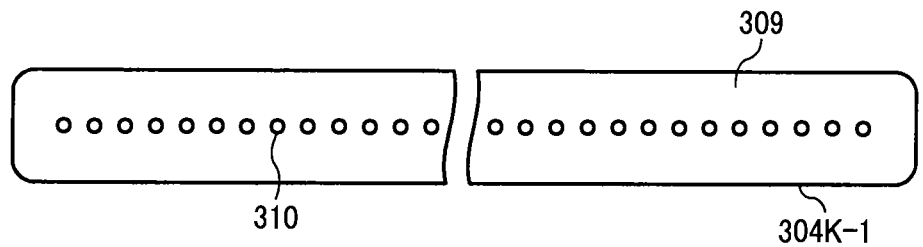
FIG. 4 is a magnified view of the droplet discharge head.

The image forming part 304 is a full-line head including four recording heads 304K, 304C, 304M, and 304Y, corresponding to respective inks of black, cyan, magenta, and yellow. The recording heads 304K, 304C, 304M, and 304Y are arranged in this order with 304K being the most upstream and 304Y being the most downstream relative to the direction of conveyance of the recording medium 203. Referring to FIG. 3, the recording head 304K includes four short head units 304K-1, 304K-2, 304K-3, and 304K-4 arranged in a zigzag manner in a direction perpendicular to the direction of conveyance of the recording medium 203. This configuration secures the width of printing area. FIG. 4 is a magnified view of the head unit 304K-1. The head unit 304K-1 has a nozzle surface 309 on which multiple printing nozzles 310 are arranged in line in the longitudinal direction of the head unit 304K-1 to form a nozzle array. In the present embodiment, only one nozzle array is provided for an illustrative purpose. The number of nozzle arrays is not limited to one. Each of the other recording heads 304C, 304M, and 304Y has the same configuration as the recording head 304K. The four recording heads 304K, 304C, 304M, and 304Y are arranged at regular intervals in the direction of conveyance of the recording medium 203. This configuration makes it possible to form an image over the entire printing area through one time of printing operation.

The colors of the inks are not limited to black, cyan, magenta, and yellow. For example, a light cyan photo ink may be used.

In the aftertreatment part 305 disposed downstream from the image forming part 304, an aftertreatment liquid is applied to the recording medium 203. The aftertreatment liquid includes a component capable of forming a transparent protective layer on the recording medium 203.

In the aftertreatment part 305, the aftertreatment liquid is applied to the all part or a specific part of the surface of the image formed on the recording medium 203. Preferably, the application amount and application method of the aftertreatment liquid are varied depending on printing conditions (e.g., the type of recording medium, the amount of ink discharged to the recording medium).

The method of applying the aftertreatment liquid is selected depending the type of the aftertreatment liquid. Preferably, the above-described method of applying the pretreatment liquid or method of flying ink is used for the method of applying the aftertreatment liquid. In view of the apparatus configuration and storage stability of the aftertreatment liquid, the method of flying ink is more preferably used therefor. This method makes it possible to apply a required amount of the aftertreatment liquid to any part of the image. The aftertreatment is a process in which the aftertreatment liquid including a transparent resin is applied to the surface of the image to form a protective layer in such a manner that the amount of deposit of the aftertreatment liquid when dried becomes in the range of from 0.5 to 10 g/m².

The amount of deposit of the aftertreatment liquid when dried is preferably in the range of from 0.5 to 10 g/m², and more preferably from 2 to 8 g/m². When the amount of deposit is less than 0.5 g/m², image quality (e.g., image density, color saturation, gloss value, fixability) improves very little. When the amount of deposit is in excess of 10 g/m², drying property of the protective layer deteriorates and image-quality-enhancing effect becomes saturated, thus becoming more disadvantageous in terms of cost.

A post-aftertreatment drying part 306 may be disposed on a downstream side from aftertreatment part 305, as illustrated in FIG. 1. The post-aftertreatment drying part 306 includes heat rollers 313 and 314. The recording medium 203 to which the aftertreatment liquid has been applied is conveyed to the heat rollers 313 and 314 by conveyance rollers. The heat rollers 313 and 314 are heated to a high temperature. Thus, upon contact of the heat rollers 313 and 314 with the recording medium 203 to which the aftertreatment liquid has been applied, moisture is evaporated from the recording medium 203 by transmission of heat, thus drying the recording medium 203. The configuration of the post-aftertreatment drying part 306 is not limited to the above-described configuration. The post-aftertreatment drying part 306 may include infrared dryer, microwave dryer, hot air device, or a combination thereof (e.g., a combination of heat roller and hot air device). The dried recording medium 203 is winded up by the winder 308. When the pressing force of the winder 308 at the time of winding up the recording medium 203 is too large, there is a possibility that the image is transferred onto the back surface of the recording medium 203. To avoid such undesired transfer of the image, a pre-winding drying part 315 may be disposed, as illustrated in FIG. 1. The pre-winding drying part 315 may include infrared dryer, microwave dryer, hot air device, or a combination thereof (e.g., a combination of heat roller and hot air device).

Configuration of Head

Figure 5:
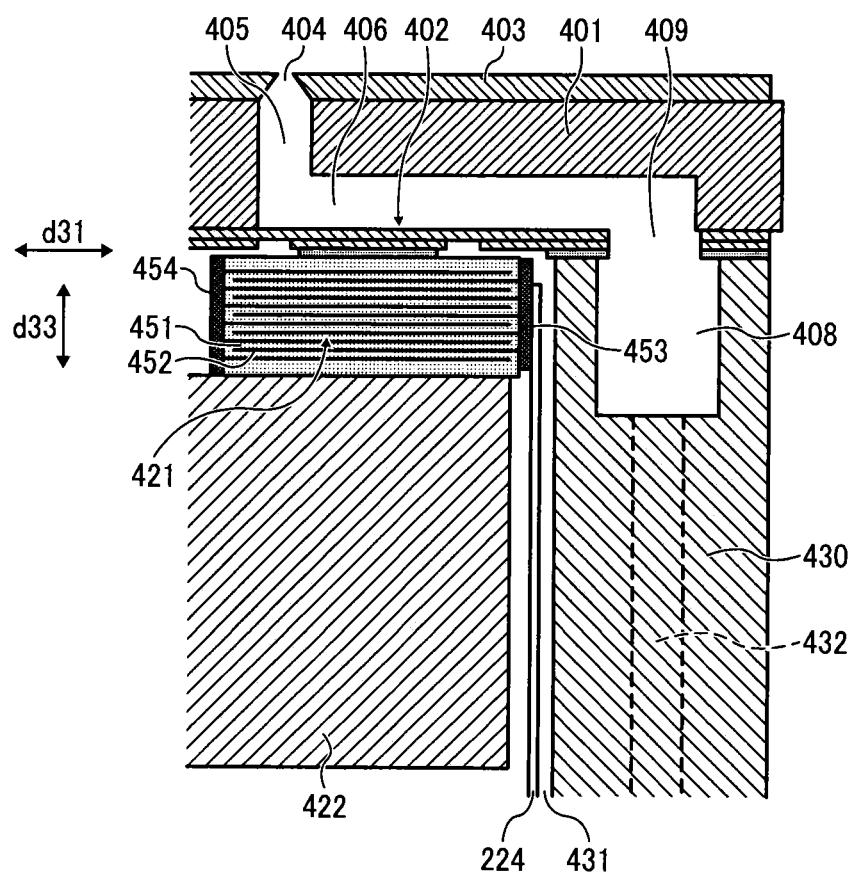
FIG. 5 is a cross-sectional schematic view of the droplet discharge head taken along the longitudinal direction of a liquid chamber in the inkjet image forming apparatus.
Figure 6:
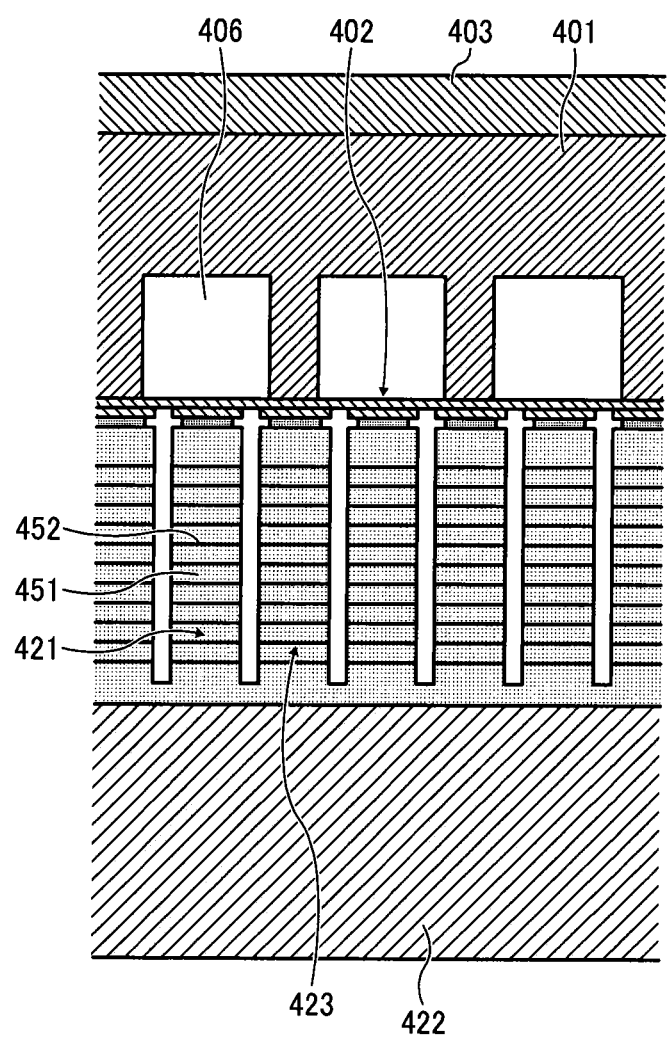
FIG. 6 is a cross-sectional schematic view of the droplet discharge head taken along the short direction of the liquid chamber in the inkjet image forming apparatus.

A droplet discharge head, serving as the recording head of the image forming apparatus according to an embodiment of the present invention is described below with reference to FIGS. 5 and 6. FIG. 5 is a cross-sectional schematic view of the droplet discharge head taken along the longitudinal direction of a liquid chamber of the head. FIG. 6 is a cross-sectional schematic view of the droplet discharge head taken along the short direction (i.e., the direction of arrangement of nozzles) of the liquid chamber of the head.

The droplet discharge head includes a channel substrate 401, a vibration plate 402, and a nozzle plate 403. The channel substrate 401 is formed by anisotropic etching of a monocrystal silicon substrate. The vibration plate 402, which may be formed of electroformed nickel, is joined to a lower surface of the channel substrate 401. The nozzle plate 403 is joined to an upper surface of the channel substrate 401. The channel substrate 401, vibration plate 402, and nozzle plate 403 are laminated to form a nozzle communication channel 405, a liquid chamber 406, and an ink supply port 409. The nozzle communication channel 405 is communicated with a nozzle 404 that discharges droplets of the ink. The ink supply port 409 is communicated with a common liquid chamber 408 for supplying the ink to the liquid chamber 406.

The droplet discharge head further includes a piezoelectric element 421 and a base substrate 422 to which the piezoelectric element 421 is fixedly joined. The piezoelectric element 421 is a two-row laminated actuator, serving as an electromechanical transducer, that deforms the vibration plate 402 to pressurize the ink in the liquid chamber 406. The piezoelectric element 421 includes a supporting part 423. The supporting part 423 is formed at the same time when a piezoelectric element material is division-processed to form the piezoelectric element 421. The supporting part 423 merely functions as a support since no driving voltage is applied thereto.

The piezoelectric element 421 is connected to an FPC (flexible print circuit) cable 224 to be coupled to a driving circuit (driving IC).

The peripheral area of the vibration plate 402 is joined to a frame member 430. The frame member 430 has a penetrating part 431, a recess that is forming the common liquid chamber 408, and an ink supply though-hole 432. The penetrating part 431 stores an actuator unit including the piezoelectric element 421 and the base substrate 422 therein. The ink supply though-hole 432 supplies the ink to the common liquid chamber 408 from the outside. The frame member 430 may be formed by injection-molding of a thermosetting resin (e.g., epoxy resin) or polyphenylene sulfate.

The channel substrate 401 may be formed by anisotropic etching of a monocrystal silicon substrate having a crystal plane orientation of (110) with an alkaline etching liquid (e.g., aqueous solution of potassium hydroxide (KOH)), to have a recess and a through-hole serving as the nozzle communication channel 405 and the liquid chamber 406. The monocrystal silicon substrate can be replaced with a stainless-steel substrate or a photosensitive resin.

The vibration plate 402 may be formed of a nickel plate prepared by electroforming. The vibration plate 402 may also be formed of a metal plate or a metal-resin-bonded member. To the vibration plate 402, the piezoelectric element 421 and the supporting part 423 are adhesively bonded. The frame member 430 is also adhesively bonded to the vibration plate 402.

The nozzle plate 403 has the nozzle 404 having a diameter in the range of from 10 to 30 μm corresponding to the liquid chamber 406. The nozzle plate 403 is adhesively bonded to the channel substrate 401. The nozzle plate 403 is formed of a metal member on which nozzles is formed, having a water repellent layer on its outermost surface.

The piezoelectric element 421 is a laminated piezoelectric element (e.g., piezoelectric zirconate titanate (PZT)) in which a piezoelectric material 451 and an internal electrode 452 are alternately laminated. The internal electrodes 452 are alternately drawn out from different edge faces of the piezoelectric element 421 and connected to an individual electrode 453 or a common electrode 454. In the present embodiment, the piezoelectric element 421 displaces in a d33 direction to pressurize the ink in the liquid chamber 406. Alternatively, the piezoelectric element 421 may displaces in a d31 direction to pressurize the ink in the liquid chamber 406. According to another embodiment, one row of the piezoelectric element 421 may be disposed on the base substrate 422.

In the droplet discharge head, as the voltage applied to the piezoelectric element 421 is decreased from the standard voltage, the piezoelectric element 421 contracts to lower the vibration plate 402 to expand the volume of the liquid chamber 406. Thus, the ink flows into the liquid chamber 406. As the voltage applied to the piezoelectric element 421 is increased, the piezoelectric element 421 expands in the direction of lamination to deform the vibration plate 402 toward the nozzle 404 to contract the volume of the liquid chamber 406. Thus, the ink in the liquid chamber 406 is pressurized and discharged (injected) from the nozzle 404 into droplets.

As the voltage applied to the piezoelectric element 421 is returned to the standard voltage, the vibration plate 402 returns to the initial position to expand the volume of the liquid chamber 406 while generating negative pressure. Thus, the liquid chamber 406 is filled with the ink from the common liquid chamber 408. After the vibration of the meniscus surface of the nozzle 404 has attenuated and stabilized, the operation transits to next discharge procedure.

The method of driving the head is not limited to the above-described procedure (i.e., drawing and pushing) and may be merely of drawing or pushing depending on drive waveform.

In the present embodiment, the pressure generator for pressurizing ink in an ink flow path may be of any of the following types: a piezo type in which a piezoelectric element deforms a vibration plate forming a wall surface of the ink flow path to vary the inner volume of the ink flow path to discharge droplets of the ink (as described in Japanese Unexamined Patent Application Publication No. 02-51734); a thermal type in which a heat element heats an ink in an ink flow path to generate bubbles (as described in Japanese Unexamined Patent Application Publication No. 61-59911); and an electrostatic type in which a vibration plate forming a wall surface of an ink flow path and an electrode are facing each other and an electrostatic force generated between the vibration plate and the electrode deforms the vibration plate to vary the inner volume of the ink flow path to discharge droplets of the ink (as described in Japanese Unexamined Patent Application Publication No. 06-71882).

EXAMPLES

Having generally described this invention, further understanding can be obtained by reference to certain specific examples which are provided herein for the purpose of illustration only and are not intended to be limiting. In the descriptions in the following examples, the numbers represent mass ratios in parts, unless otherwise specified.

Examples 1 to 25 and Comparative Examples 1 to 6

Preparation of Inks

Preparation Example 1

Preparation of Self-Dispersible Pigment Dispersion Liquid 1 (Surface-Modified Black Pigment Dispersion Liquid 1)

First, 100 g of BLACK PEARLS® 1000 available from Cabot Corporation (a carbon black having a BET specific surface area of 343 $m^2/g$ and a DBPA of 105 mL/100 g), 100 mmol of sulfanilic acid, and 1 L of ion-exchange high-purity water were mixed by a mixer (available from Silverson) at a revolution of 6,000 rpm at room temperature. If the resulting slurry had a pH higher than 4, 100 mmol of nitric acid was added thereto. Thirty minutes later, 100 mmol of sodium nitrite dissolved in a small amount of ion-exchange high-purity water was gently added to the mixture. The mixture was then heated to 60° C. while being stirred and subjected to a reaction for one hour. Thus, a modified pigment that is the carbon black to which sulfanilic acid is adducted was generated. Next, a 10% methanol solution of tetrabutylammonium hydroxide was added to the mixture to adjust the pH to 9. Thirty minutes later, a modified pigment dispersion liquid was obtained. The modified pigment dispersion liquid, containing the modified pigment bonded with at least one of sulfanilic acid group and sulfanilic acid tetrabutylammonium salt, was subjected to ultrafiltration using ion-exchange high-purity water and a dialysis membrane. The modified pigment dispersion liquid was further subjected to ultrasonic dispersion. Thus, another modified pigment dispersion liquid in which the solid pigment content was condensed to 20% was obtained. The surface treatment level was 0.75 mmol/g. The particle diameter (D50) measured by a particle size distribution analyzer (NANOTRAC UPA-EX150 available from Nikki so Co., Ltd.) was 120 nm.

Preparation Example 2

Preparation of Self-Dispersible Pigment Dispersion Liquid 2 (Surface-Modified Black Pigment Dispersion Liquid 2)

A ProcessAll 4HV Mixer (4 L) was charged with 500 g of BLACK PEARLS® 880 available from Cabot Corporation (a carbon black having a BET specific surface area of 220 $m^2/g$ and a DBPA of 105 mL/100 g), 1 L of ion-exchange high-purity water, and 1 mol of 4-aminobenzoic acid. The mixture was then strongly mixed at a revolution of 300 rpm for 10 minutes while being heated to 60° C. A 20% aqueous solution of sodium nitrite (1-mol equivalent based on 4-aminobenzoic acid) was added to the mixture over a period of 15 minutes. The mixture was stirred for 3 hours while being heated to 60° C. The mixture was diluted with 750 mL of ion-exchange high-purity water to deposit the reaction product. Next, a 10% methanol solution of tetrabutylammonium hydroxide was added to the mixture to adjust the pH to 9. Thirty minutes later, a modified pigment dispersion liquid was obtained. The modified pigment dispersion liquid, containing the modified pigment bonded with at least one of aminobenzoic acid group and aminobenzoic acid tetrabutylammonium salt, was subjected to ultrafiltration using ion-exchange high-purity water and a dialysis membrane. The modified pigment dispersion liquid was further subjected to ultrasonic dispersion. Thus, another modified pigment dispersion liquid in which the solid pigment content was condensed to 20% was obtained. The surface treatment level was 0.5 mmol/g. The particle diameter (D50) measured by a particle size distribution analyzer (NANOTRAC UPA-EX150 available from Nikkiso Co., Ltd.) was 104 nm.

Preparation Example 3

Preparation of Resin-Coated Pigment Dispersion Liquid 3 (Carbon-Black-Pigment-Containing Polymer Particle Dispersion Liquid 3)
Preparation of Polymer Solution A After sufficiently replacing the air in a 1-L flask equipped with a mechanical stirrer, a thermometer, a nitrogen gas inlet pipe, a reflux pipe, and a dropping funnel with nitrogen gas, 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol were mixed in the flask and heated to 65° C. Next, a mixture liquid containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobis methylvaleronitrile, and 18 g of methyl ethyl ketone was dropped in the flask over a period of 2.5 hours. Thereafter, another mixture liquid containing 0.8 g of azobis methylvaleronitrile and 18 g of methyl ethyl ketone was further dropped in the flask over a period of 0.5 hours. After aging the mixture at 65° C. for 1 hour, 0.8 g of azobis methylvaleronitrile was added thereto, and the mixture was further aged for 1 hour. After completion of the reaction, 364 g of methyl ethyl ketone was added to the flask. Thus, 800 g a polymer solution A having a concentration of 50% was obtained.

Preparation of Carbon-Black-Pigment-Containing Polymer Particle Dispersion Liquid 3

First, 28 g of the polymer solution A, 42 g of C.I. Carbon Black (FW100 available from Degussa), 13.6 g of a 1-mol/L aqueous solution of potassium hydroxide, 20 g of methyl ethyl ketone, and 13.6 g of ion-exchange water were sufficiently mixed and stirred. The resulting mixture was kneaded with a roll mill. The resulting paste was poured in 200 g of pure water and sufficiently stirred, and methyl ethyl ketone and water were evaporated therefrom using an evaporator. The resulting dispersion liquid was subjected to pressure filtration using a polyvinylidene fluoride membrane filter having an average pore diameter of 5.0 μm to remove coarse particles. Thus, a carbon-black-pigment-containing polymer particle dispersion liquid having a solid pigment content of 15% by mass and a solid content of 20% by mass was prepared. The particle diameter (D50) of the polymer particle contained in the carbon-black-pigment-containing polymer particle dispersion liquid measured by a particle size distribution analyzer (NANOTRAC UPA-EX150 available from Nikkiso Co., Ltd.) was 104 nm.

Preparation Example 4

Preparation of Resin-Coated Cyan Pigment Dispersion Liquid 4

After sufficiently replacing the air in a reaction vessel with nitrogen gas, 20 g of an organic solvent (methyl ethyl ketone), 0.03 g of a chain transfer agent (2-mercaptoethanol), a polymerization initiator, 10 g of methacrylic acid, 22.5 g of styrene monomer, 2.5 g of polyethylene glycol monomethacrylate (ethylene oxide=15), 5 g of polyethylene glycol-propylene glycol monomethacrylate (ethylene oxide=5, propylene oxide=7), and 10 g of styrene macromer were mixed and stirred in the reaction vessel at 75° C. to cause a polymerization. Further, 0.9 g of 2,2'-azobis(2,4-dimethylvaleronitrile) was added to the reaction vessel, and the mixture was aged at 80° C. for 1 hour. Thus, a water-insoluble polymer solution (1) was obtained.

The water-insoluble polymer solution (1) was dried under reduced pressure, and 5 g of the dried product was dissolved in 15 g of methyl ethyl ketone. An aqueous solution of sodium hydroxide was added to the solution to neutralize the polymer. Further, 15 g of C.I. Pigment Blue 15:3 was added to the solution and kneaded by a disperser while adding water to the solution.

After the kneaded product was mixed with 100 g of ion-exchange water, methyl ethyl ketone was removed therefrom under reduced pressure at 60° C., and a part of water was further removed therefrom. Thus, a resin-coated cyan pigment dispersion liquid having a solid content of 15% by mass was prepared. (Pigment:Water-insoluble Polymer=1:0.3) The pigment in this dispersion liquid had a volume average particle diameter of 91 nm.

Preparation Example 5

Preparation of Surfactant-Dispersing-Type Black Pigment Dispersion Liquid 1

First, 175 parts of a carbon black (NIPEX 160 available from Deggusa, having a BET specific surface area of 150 m²/g, an average primary particle diameter of 20 nm, a pH of 4.0, and a DBP oil absorption of 620 g/100 g), 175 parts of a sodium naphthalenesulfonate formalin condensate (PAIONIN A-45-PN available from Takemoto Oil & Fat Co., Ltd., the total content of dimer, trimer, and tetramer of naphthalenesulfonic acid is 50% by mass), and 650 parts of distilled water were premixed. Thus, a mixture slurry (a) was prepared. The mixture slurry (a) was subjected to a circulation dispersion treatment using a disc-type media mill (DMR available from Ashizawa Finetech Ltd.) filled with zirconia beads having a diameter of 0.05 mm with a filing ratio of 55% at a peripheral speed of 10 m/s and a liquid temperature of 10° C. for 3 minutes. The mixture slurry (a) was then subjected to centrifugal separation using a centrifugal separator (MODEL-7700 available from KUBOTA Corporation) to remove coarse particles. Thus, a surfactant-dispersing-type black pigment dispersion 1 was prepared.

Preparation Example 6

Preparation of Aqueous Dispersion of Polyurethane Resin 1

A simple pressure reactor equipped with a stirrer and a heater was charged with 287.9 parts of a crystalline polycarbonate diol (DURANOL™ T6002 available from Asahi Kasei Chemicals Corp.) having a number average molecular weight (Mn) of 2,000, 3.6 parts of 1,4-butanediol, 8.9 parts of DMPA (dimethylol propionic acid), 98.3 parts of hydrogenated MDI, and 326.2 parts of acetone while introducing nitrogen thereto. The contents were heated to 90° C. and subjected to an urethane-forming reaction over a period of 8 hours to produce a prepolymer.

The reaction product mixture was cooled to 40° C. and mixed with 10.0 parts of triethylamine. The mixture was further mixed with 568.8 parts of water, and emulsification was caused by a rotor-stator-type mechanical emulsifier. Thus, an aqueous dispersion was prepared. Next, 28.1 parts of a 10% aqueous solution of ethylenediamine was added to the above-obtained aqueous dispersion being stirred. The aqueous dispersion was further stirred for 5 hours at 50° C. to cause a chain elongation reaction.

Acetone was removed from the aqueous dispersion under reduced pressure at 65° C., and the moisture content was controlled. Thus, an aqueous dispersion of a polyurethane resin 1 having a solid content of 40% by mass was prepared. The particle diameter (D50) of the aqueous dispersion of the polyurethane resin 1 measured by a particle size distribution analyzer (NANOTRAC UPA-EX150 available from Nikkiso Co., Ltd.) was 9 nm.

Preparation Example 7

Preparation of Aqueous Dispersion of Polyurethane Resin 2

The procedure in Preparation Example 6 was repeated except for changing the addition amount of triethylamine to 8.9 parts. Thus, an aqueous dispersion of a polyurethane resin 2 was prepared. The particle diameter (D50) of the aqueous dispersion of the polyurethane resin 2 measured by a particle size distribution analyzer (NANOTRAC UPA-EX150 available from Nikkiso Co., Ltd.) was 23 nm.

Preparation Example 8

Preparation of Aqueous Dispersion of Polyurethane Resin 3

The procedure in Preparation Example 6 was repeated except for changing the addition amount of triethylamine to 7.9 parts. Thus, an aqueous dispersion of a polyurethane resin 3 was prepared. The particle diameter (D50) of the aqueous dispersion of the polyurethane resin 3 measured by a particle size distribution analyzer (NANOTRAC UPA-EX150 available from Nikkiso Co., Ltd.) was 34 nm.

Preparation Example 9

Preparation of Aqueous Dispersion of Polyurethane Resin 4

The procedure in Preparation Example 6 was repeated except for changing the addition amount of triethylamine to 6.8 parts. Thus, an aqueous dispersion of a polyurethane resin 4 was prepared. The particle diameter (D50) of the aqueous dispersion of the polyurethane resin 4 measured by a particle size distribution analyzer (NANOTRAC UPA-EX150 available from Nikkiso Co., Ltd.) was 49 nm.

Preparation Example 10

Preparation of Aqueous Dispersion of Polyurethane Resin 5

The procedure in Preparation Example 6 was repeated except for changing the addition amount of triethylamine to 4.9 parts. Thus, an aqueous dispersion of a polyurethane resin 5 was prepared. The particle diameter (D50) of the aqueous dispersion of the polyurethane resin 5 measured by a particle size distribution analyzer (NANOTRAC UPA-EX150 available from Nikkiso Co., Ltd.) was 70 nm.

Preparation Example 11

Preparation of Aqueous Dispersion of Polyurethane Resin 6

The procedure in Preparation Example 6 was repeated except for changing the addition amount of triethylamine to 5.7 parts. Thus, an aqueous dispersion of a polyurethane resin 6 was prepared. The particle diameter (D50) of the aqueous dispersion of the polyurethane resin 6 measured by a particle size distribution analyzer (NANOTRAC UPA-EX150 available from Nikkiso Co., Ltd.) was 89 nm.

Preparation Example 12

Preparation of Aqueous Dispersion of Polyurethane Resin 7

The procedure in Preparation Example 6 was repeated except for changing the addition amount of triethylamine to 7.0 parts. Thus, an aqueous dispersion of a polyurethane resin 7 was prepared. The particle diameter (D50) of the aqueous dispersion of the polyurethane resin 7 measured by a particle size distribution analyzer (NANOTRAC UPA-EX150 available from Nikkiso Co., Ltd.) was 121 nm.

Preparation Example 13

Preparation of Aqueous Dispersion of Acrylic Silicone Resin

After sufficiently replacing the air in a 1-L flask equipped with a mechanical stirrer, a thermometer, a nitrogen gas inlet pipe, a reflux pipe, and a dropping funnel with nitrogen gas, 17.5 g of LATEMUL S-180 (available from Kao Corporation) and 350 g of ion-exchange water were mixed in the flask and heated to 65° C.

After the heating, 3.0 g of t-butyl peroxybenzoate (serving as a reaction initiator) and 1.0 g of sodium isoascorbate were added to the flask. Five minutes later, a mixture of 45 g of methyl methacrylate, 160 g of 2-etyhylhexyl methacrylate, 5 g of acrylic acid, 45 g of butyl methacrylate, 30 g of cyclohexyl methacrylate, 15 g of vinyl triethoxysilane, 8.0 g of LATEMUL 5-180 (available from Kao Corporation), and 340 g of ion-exchange water was dropped in the flask over a period of 3 hours. The flask contents were aged at 80° C.

for 2 hours and then cooled to normal temperature. The pH thereof was adjusted to 7 to 8 using sodium hydroxide. Ethanol was removed using an evaporator, and the moisture content was controlled. Thus, 730 g of an aqueous dispersion of an acrylic silicone resin having a solid content of 40% by mass was prepared. The particle diameter (D50) of the aqueous dispersion of the acrylic silicone resin measured by a particle size distribution analyzer (NANOTRAC UPA-EX150 available from Nikkiso Co., Ltd.) was 43 nm.

Examples and Comparative Examples

Preparation of Inks

In the descriptions in the following examples, the contents of resin particles specifically represent the solid contents thereof.

Example 1

In a vessel equipped with a stirrer, 20.00 parts of 1,3-butanediol, 10.00 parts of 3-methyl-1,3-butanediol, 8.00 parts of glycerin, 2.00 parts of 2-ethyl-1,3-hexanediol, and 0.50 parts of a surfactant were uniformly stirred for about 30 minutes. Next, 37.50 parts of the self-dispersible pigment dispersion liquid 1 (prepared in Preparation Example 1) and high-purity water were added to the vessel and uniformly stirred for about 60 minutes. Further, 4.50 parts of the polyurethane resin 4 (prepared in Preparation Example 9) was added to the vessel and uniformly stirred for 30 minutes. The resulting mixture was subjected to pressure filtration using a polyvinylidene fluoride membrane filter having an average pore diameter of 1.2 µm to remove coarse particles and foreign substances. Thus, an ink of Example 1 was prepared. The addition amount of high-purity water was adjusted so that the total amount of the vessel contents became 100 parts.

The added surfactant was a fluorine-based surfactant FS-300.

The fluorine-based surfactant FS-300 was a polyoxyalkylene($C_2$-$C_3$)-2-perfluoroalkyl($C_4$-$C_{16}$) ethyl ether having a solid content of 40%, available from E. I. du Pont de Nemours and Company.

Examples 2 to 25 and Comparative Examples 1 to 6

In a manner similar to the procedure in Example 1, a water-soluble organic solvent and a surfactant were mixed, a water-dispersible colorant (pigment dispersion) and high-purity water were mixed therein, and a water-dispersible resin was further mixed therein, according to the formulation described in the following Tables 1a, 1b, 2a, 2b, 3a and 3b. In Examples 20 to 25, a foam inhibitor was added in combination with a surfactant. The used foam inhibitor was 2,4,7,9-tetramethyldecane-4,7-diol available from Nissin Chemical Industry Co., Ltd. under the trade name Enviro-Gem® AD01.

The addition amount thereof was described in the Tables. In Example 24, an acetylene-glycol-based surfactant 2,4,7,9-tetramethyl-5-decyn-4,7-diol was added as a surfactant in combination with the fluorine-based surfactant FS-300.

The addition amount thereof was described in the Tables. In each Example, the resulting mixture was subjected to pressure filtration using a polyvinylidene fluoride membrane filter having an average pore diameter of 1.2 µm to remove coarse particles and foreign substances. Thus, inks of Examples 2 to 25 and Comparative Examples 1 to 6 were prepared.

TABLE 1

| | | Particle Diameter (D50) (nm) | Boiling Point (°C.) | Molecular Weight | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|
| Colorant Dispersion | Self-dispersible pigment dispersion liquid 1 (Preparation Ex. 1) | 120 | | | 37.50 | — | — | — | — | 37.50 | 37.50 | 37.50 | — | — | — |
| | Self-dispersible pigment dispersion liquid 2 (Preparation Ex. 2) | 104 | | | — | 37.50 | — | — | — | — | — | — | — | — | — |
| | Resin-coated pigment dispersion liquid 3 (Preparation Ex. 3) | 104 | | | — | — | 47.00 | — | — | — | — | — | — | — | — |
| | Resin-coated cyan pigment dispersion liquid 4 (Preparation Ex. 4) | 91 | | | — | — | — | 47.00 | — | — | — | — | 47.00 | 47.00 | 47.00 |
| | Surfactant-dispersing-type pigment dispersion liquid 1 (Preparation Ex. 5) | | | | — | — | — | — | 55.00 | — | — | — | — | — | — |
| Resin Particle | Polycarbonate-based urethane resin 1 (Preparation Ex. 6) | 9 | | | 4.50 | 5.00 | 4.50 | 5.00 | 4.50 | — | — | — | — | — | — |
| | Polycarbonate-based urethane resin 2 (Preparation Ex. 7) | 23 | | | — | — | — | — | — | 4.00 | — | — | — | — | — |
| | Polycarbonate-based urethane resin 3 (Preparation Ex. 8) | 34 | | | — | — | — | — | — | — | 4.00 | — | — | — | — |
| | Polycarbonate-based urethane resin 4 (Preparation Ex. 9) | 49 | | | — | — | — | — | — | — | — | 4.00 | — | — | — |
| | Polycarbonate-based urethane resin 5 (Preparation Ex. 10) | 70 | | | — | — | — | — | — | — | — | — | 4.50 | — | — |
| | Polycarbonate-based urethane resin 6 (Preparation Ex. 11) | 89 | | | — | — | — | — | — | — | — | — | — | 5.00 | — |
| | Polycarbonate-based urethane resin 7 (Preparation Ex. 12) | 121 | | | — | — | — | — | — | — | — | — | — | — | 5.00 |
| | Polyester-based urethane resin | 17 | | | — | — | — | — | — | — | — | — | — | — | — |
| | Polyether-based urethane resin | 15.4 | | | — | — | — | — | — | — | — | — | — | — | — |
| | Acrylic-silicone resin (Preparation Ex. 13) | 43 | | | — | — | — | — | — | — | — | — | — | — | — |

TABLE 1-continued

| | | Particle Diameter (D50) (nm) | Boiling Point (° C.) | Molecular Weight | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|
| Amine Compound | Diethylamine | | 55 | 73 | — | — | — | — | — | — | — | — | — | — | — |
| | Triethylamine | | 89 | 101 | — | — | — | — | — | — | — | — | — | — | — |
| | Dimethylethanolamine | | 133 | 89 | — | — | — | — | — | — | — | — | — | — | — |
| | Aminomethylpropanol | | 165 | 89 | 0.10 | 0.50 | 0.30 | 0.40 | 0.10 | 0.10 | 0.10 | 0.30 | 0.20 | 0.10 | 0.20 |
| | Piperazine | | 144 | 86 | — | — | — | — | — | — | — | — | — | — | — |
| | Aminomethylpropanol propanediol | | 152 | 119 | — | — | — | — | — | — | — | — | — | — | — |
| Organic Solvent | 1-3-Butanediol | | | | 20.00 | 20.00 | 20.00 | 20.00 | 20.00 | 20.00 | 20.00 | 20.00 | 20.00 | 20.00 | 20.00 |
| | 3-Methyl-1,3-butanediol | | | | 10.00 | 10.00 | 10.00 | 10.00 | 10.00 | 10.00 | 10.00 | 10.00 | 10.00 | 10.00 | 10.00 |
| | Glycerin | | | | 8.00 | — | 8.00 | — | 8.00 | 4.00 | 8.00 | 8.00 | — | 8.00 | — |
| | Triethyleneglicol | | | | — | 8.00 | — | 8.00 | — | — | — | — | 8.00 | — | 8.00 |
| | 2-Ethyl-1,3-hexanediol | | | | 2.00 | 2.00 | 2.00 | 2.00 | 2.00 | 2.00 | 2.00 | 2.00 | 2.00 | 2.00 | 2.00 |
| | 2,2,4-Trimethyl-1,3-pentanediol | | | | — | — | — | — | — | — | — | — | — | — | — |
| Surfactant | Fluorine-based surfactant (FS-300) | | | | 0.50 | 0.50 | 0.50 | 0.50 | 0.50 | 0.50 | 0.50 | 0.50 | 0.50 | 0.50 | 0.50 |
| | Acetylene-glycol-based surfactant (2,4,7,9-tetramethyl-5-decyn-4,7-diol) | | | | — | — | — | — | — | — | — | — | — | — | — |
| Foam Inhibitor | 2,4,7,9-tetramethyldecane-4,7-diol | | | | — | — | — | — | — | — | — | — | — | — | — |
| | Amine Compound/Resin particle | | | | 0.02 | 0.10 | 0.07 | 0.08 | 0.02 | 0.03 | 0.03 | 0.08 | 0.04 | 0.02 | 0.04 |
| | Resin Particle/Colorant (based on solid content) | | | | 0.60 | 0.67 | 0.64 | 0.71 | 0.63 | 0.53 | 0.53 | 0.53 | 0.64 | 0.71 | 0.71 |
| | Water | | | | Residual quantity | Residual quantity | Residual quantity | Residual quantity | Residual quantity | Residual quantity | Residual quantity | Residual quantity | Residual quantity | Residual quantity | Residual quantity |

TABLE 2

| | Particle Diameter (D50) (nm) | Boiling Point (°C.) | Molecular Weight | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|---|---|---|---|
| Colorant Dispersion | | | | | | | | | | | | | | | | | |
| Self-dispersible pigment dispersion liquid 1 (Preparation Ex. 1) | 120 | | | 37.50 | 37.50 | 37.50 | 37.50 | 37.50 | 37.50 | 37.50 | 37.50 | — | — | — | — | — | — |
| Self-dispersible pigment dispersion liquid 2 (Preparation Ex. 2) | 104 | | | — | — | — | — | — | — | — | — | — | — | — | — | — | 37.50 |
| Resin-coated pigment dispersion liquid 3 (Preparation Ex. 3) | 104 | | | — | — | — | — | — | — | — | — | 47.00 | 47.00 | 47.00 | 47.00 | 47.00 | — |
| Resin-coated cyan pigment dispersion liquid 4 (Preparation Ex. 4) | 91 | | | — | — | — | — | — | — | — | — | — | — | — | — | — | — |
| Surfactant-dispersing-type pigment dispersion liquid 1 (Preparation Ex. 5) | | | | — | — | — | — | — | — | — | — | — | — | — | — | — | — |
| Resin Particle | | | | | | | | | | | | | | | | | |
| Polycarbonate-based urethane resin 1 (Preparation Ex. 6) | 9 | | | — | — | — | — | — | — | — | — | — | — | — | — | — | — |
| Polycarbonate-based urethane resin 2 (Preparation Ex. 7) | 23 | | | — | — | — | — | — | 5.00 | — | — | — | — | — | — | — | — |
| Polycarbonate-based urethane resin 3 (Preparation Ex. 8) | 34 | | | — | — | — | — | — | — | 0.35 | — | — | — | — | — | — | — |
| Polycarbonate-based urethane resin 4 (Preparation Ex. 9) | 49 | | | — | — | 5.00 | 5.00 | 4.50 | — | — | 15.00 | 4.50 | 4.50 | 4.50 | 4.50 | 4.50 | 5.00 |
| Polycarbonate-based urethane resin 5 (Preparation Ex. 10) | 70 | | | — | — | — | — | — | — | — | — | — | — | — | — | — | — |
| Polycarbonate-based urethane resin 6 (Preparation Ex. 11) | 89 | | | — | — | — | — | — | — | — | — | — | — | — | — | — | — |
| Polycarbonate-based urethane resin 7 (Preparation Ex. 12) | 121 | | | — | — | — | — | — | — | — | — | — | — | — | — | — | — |
| Polyester-based urethane resin | 17 | | | 4.00 | — | — | — | — | — | — | — | — | — | — | — | — | — |
| Polyether-based urethane resin | 15.4 | | | — | 6.00 | — | — | — | — | — | — | — | — | — | — | — | — |
| Acrylic-silicone resin (Preparation Ex. 13) | 43 | | | — | — | — | — | — | — | — | — | — | — | — | — | — | — |

TABLE 2-continued

| | | Boiling Point (° C.) | Molecular Weight | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|---|---|---|---|
| Amine Compound | Diethylamine | 55 | 73 | — | — | — | — | — | — | — | — | — | — | — | — | — | — |
| | Triethylamine | 89 | 101 | — | — | — | — | — | — | — | — | — | — | — | — | — | — |
| | Dimethylethanolamine | 133 | 89 | — | — | — | — | — | — | — | — | — | — | — | — | — | — |
| | Aminomethylpropanol | 165 | 89 | 0.20 | 0.20 | 0.40 | — | 0.06 | 0.03 | 0.20 | 0.40 | 0.30 | 0.30 | 0.30 | 0.30 | 0.30 | 0.50 |
| | Piperazine | 144 | 86 | — | — | — | 0.20 | — | — | — | — | — | — | — | — | — | — |
| | Aminomethylpropanol propanediol | 152 | 119 | — | — | — | — | — | — | — | — | — | — | — | — | — | — |
| Organic Solvent | 1-3-Butanediol | | | 25.00 | 20.00 | 20.00 | 25.00 | 10.00 | 25.00 | 25.00 | 10.00 | 20.00 | 20.00 | 20.00 | 20.00 | 20.00 | 20.00 |
| | 3-Methyl-1,3-butanediol | | | 8.00 | 10.00 | 10.00 | 8.00 | 10.00 | 10.00 | 15.00 | 10.00 | — | 10.00 | 10.00 | 10.00 | 10.00 | 10.00 |
| | Glycerin | | | 4.00 | — | 8.00 | 4.00 | 10.00 | 10.00 | 12.00 | — | 8.00 | 8.00 | 8.00 | 8.00 | 8.00 | — |
| | Triethyleneglicol | | | — | 8.00 | — | — | — | — | — | 8.00 | — | — | — | — | — | 8.00 |
| | 2-Ethyl-1,3-hexanediol | | | 2.00 | 2.00 | 2.00 | 2.00 | 2.00 | 2.00 | — | 2.00 | 2.00 | 2.00 | 2.00 | 2.00 | 2.00 | — |
| | 2,2,4-Trimethyl-1,3-pentanediol | | | — | — | — | — | — | — | 2.00 | — | — | — | — | — | — | 2.00 |
| Surfactant | Fluorine-based surfactant (FS-300) | | | 0.50 | 0.50 | 0.50 | 0.50 | 0.50 | 0.50 | 0.50 | 0.50 | 0.50 | 0.50 | 0.50 | 0.50 | 0.25 | 0.50 |
| | Acetylene-glycol-based surfactant (2,4,7,9-tetramethyl-5-decyn-4,7-diol) | | | — | — | — | — | — | — | — | — | — | — | — | — | 0.10 | — |
| Foam Inhibitor | 2,4,7,9-tetramethyldecane-4,7-diol | | | — | — | — | — | — | — | — | — | — | — | — | — | — | — |
| | Amine Compound/ Resin particle | | | 0.05 | 0.03 | 0.08 | 0.04 | 0.01 | 0.06 | 0.57 | 0.03 | 0.05 | 0.07 | 0.07 | 0.07 | 0.07 | 0.05 |
| | Resin Particle/Colorant (based on solid content) | | | 0.53 | 0.80 | 0.67 | 0.67 | 0.60 | 0.67 | 0.05 | 2.00 | 0.07 | 0.07 | 0.07 | 0.07 | 0.07 | 0.10 |
| | Water | | | Residual quantity | Residual quantity | Residual quantity | Residual quantity | Residual quantity | Residual quantity | Residual quantity | Residual quantity | 0.64 | 0.64 | 0.64 | 0.64 | 0.64 | 0.67 |
| | | | | | | | | | | | | Residual quantity | Residual quantity | Residual quantity | Residual quantity | Residual quantity | Residual quantity |

TABLE 3

| | | Particle Diameter (D50) (nm) | Boiling Point (° C.) | Molecular Weight | Comparative Example 1 | Comparative Example 2 | Comparative Example 3 | Comparative Example 4 | Comparative Example 5 | Comparative Example 6 |
|---|---|---|---|---|---|---|---|---|---|---|
| Colorant Dispersion | Self-dispersible pigment dispersion liquid 1 (Preparation Ex. 1) | 120 | | | 37.50 | 37.50 | 37.50 | 37.50 | 37.50 | 37.50 |
| | Self-dispersible pigment dispersion liquid 2 (Preparation Ex. 2) | 104 | | | — | — | — | — | — | — |
| | Resin-coated pigment dispersion liquid 3 (Preparation Ex. 3) | 104 | | | — | — | — | — | — | — |
| | Resin-coated cyan pigment dispersion liquid 4 (Preparation Ex. 4) | 91 | | | — | — | — | — | — | — |
| | Surfactant-dispersing-type pigment dispersion liquid 1 (Preparation Ex. 5) | | | | — | — | — | — | — | — |
| Resin Particle | Polycarbonate-based urethane resin 1 (Preparation Ex. 6) | 9 | | | — | — | — | — | — | — |
| | Polycarbonate-based urethane resin 2 (Preparation Ex. 7) | 23 | | | — | — | — | — | 4.00 | — |
| | Polycarbonate-based urethane resin 3 (Preparation Ex. 8) | 34 | | | — | — | — | — | — | — |
| | Polycarbonate-based urethane resin 4 (Preparation Ex. 9) | 49 | | | — | 5.00 | 5.00 | 4.00 | — | 5.00 |
| | Polycarbonate-based urethane resin 5 (Preparation Ex. 10) | 70 | | | — | — | — | — | — | — |
| | Polycarbonate-based urethane resin 6 (Preparation Ex. 11) | 89 | | | — | — | — | — | — | — |
| | Polycarbonate-based urethane resin 7 (Preparation Ex. 12) | 121 | | | — | — | — | — | — | — |
| | Polyester-based urethane resin | 17 | | | — | — | — | — | — | — |
| | Polyether-based urethane resin | 15.4 | | | — | — | — | — | — | — |
| | Acrylic-silicone resin (Preparation Ex. 13) | 43 | | | 6.00 | — | — | — | — | — |
| Amine Compound | Diethylamine | | 55 | 73 | — | 0.10 | — | — | — | — |
| | Triethylamine | | 89 | 101 | — | — | 0.20 | — | — | — |
| | Dimethylethanolamine | | 133 | 89 | — | — | — | — | — | — |
| | Aminomethylpropanol | | 165 | 89 | 0.20 | — | — | — | 4.50 | — |
| | Piperazine | | 144 | 86 | — | — | — | — | — | 0.01 |
| | Aminomethylpropanediol | | 152 | 119 | — | — | — | 0.20 | — | — |
| Organic Solvent | 1-3-Butanediol | | | | 20.00 | 20.00 | 20.00 | 25.00 | 20.00 | 25.00 |
| | 3-Methyl-1,3-butanediol | | | | 10.00 | 10.00 | 10.00 | 8.00 | 10.00 | 8.00 |
| | Glycerin | | | | — | 8.00 | 8.00 | 4.00 | 8.00 | 4.00 |
| | Triethyleneglycol | | | | 8.00 | — | — | — | — | — |
| | 2-Ethyl-1,3-hexanediol | | | | 2.00 | 2.00 | — | 2.00 | 2.00 | 2.00 |
| | 2,2,4-Trimethyl-1,3-pentanediol | | | | — | — | 2.00 | 2.00 | — | — |
| Surfactant | Fluorine-based surfactant (FS-300) | | | | 0.50 | 0.50 | 0.50 | 0.50 | 0.50 | 0.50 |
| | Acetylene-glycol-based surfactant (2,4,7,9-tetramethyl-5-decyn-4,7-diol) | | | | — | — | — | — | — | — |
| Foam Inhibitor | 2,4,7,9-tetramethyldecane-4,7-diol | | | | | | | | | |
| | Amine Compound/Resin particle | | | | 0.03 | 0.02 | 0.04 | 0.05 | 1.13 | 0.002 |
| | Resin Particle/Colorant (based on solid content) | | | | 0.80 | 0.67 | 0.67 | 0.53 | 0.53 | 0.67 |
| | Water | | | | Residual quantity | Residual quantity | Residual quantity | Residual quantity | Residual quantity | Residual quantity |

In the Tables, "Polyester-based urethane resin" represents UWS-145 available from Sanyo Chemical Industries, Ltd., having a particle diameter (D50) of 17 nm and a solid content of 31.4%. In the Tables, "Polyether-based urethane resin" represents TAKELAC™ W5661 available from Mitsui Chemicals, Inc., having a particle diameter (D50) of 15.4 mm and a solid content of 34.8%.

Properties of the inks prepared in Examples 1 to 25 and Comparative Examples 1 to 6 were measured as follows. The measurement results are shown in Table 4.

Evaluation of Ink Properties

Viscosity of Ink

Viscosity of each ink was measured with a viscometer (RE-550L available from Toki Sangyo Co., Ltd.) at 25° C.

pH of Ink pH of each ink was measured with a pH meter (HM-30R available from DKK-TOA Corporation) at 25° C.

Particle Diameter (D50) of Pigment

Each ink was diluted with pure water so that the solid content became 0.01% by mass. A particle diameter (D50) of the pigment therein was measured with a particle size distribution analyzer (NANOTRAC UPA-EX150 available from Nikkiso Co., Ltd.).

Fluidity at Moisture Evaporation

Each ink in an amount of 2.5 g was precisely weighed in a glass petri dish having a diameter of 33 mm using a precise even electronic balance which can measure weight down to 4 decimal places. The ink was stored in a thermo-hygrostat (Model PL-3KP available from ESPEC CORP.) at a temperature of 32±0.5° C. and a humidity of 30±5% under normal pressure. The ink was taken out from the thermo-hygrostat 24 hours later, and the mass thereof was measured. The ink in the petri dish was scratched with a spatula until the bottom of the petri dish became visible. The fluidity of the ink was evaluated based on the following criteria.

A: The bottom of the petri dish was filled with the ink to become invisible within 5 seconds after the scratch.

B: The bottom of the petri dish was filled with the ink to become invisible within 60 seconds after the scratch.

C: The bottom of the petri dish remained visible even after a lapse of 2 minutes or more after the scratch.

Storage Stability of Ink

Each ink was sealed in a polyethylene container and stored at 70° C. for 2 weeks. The ink was then subjected to the measurement of the particle diameter (D50) of pigment and viscosity. Storage stability was evaluated based on the rate of change in D50 and viscosity from the initial values thereof as follows.

A: The rates of change in D50 and viscosity were both 5% or less.

B: The rates of change in D50 and viscosity were both less than 10%.

C: The rates of change in D50 and viscosity were both 10% or more.

Foaming Property of Ink

Each ink in an amount of 200 ml was dropped on a water surface from a height of 900 mm over a period of 30 seconds at 25° C., and the height of the generated foam was measured, based on the method according to JIS K3362-1998, 8.5.

From the viewpoint of discharge stability, the height of the foam needs to be 45 mm or less, preferably 30 mm or less, and more preferably 15 mm or less.

Surface Tension of Ink

Static surface tension of each ink was measured with an automatic surface tensiometer (CBVP-Z available from Kyowa Interface Science Co., Ltd.) at 25° C.

Evaluation of Image Forming Process

Each ink was mounted on an inkjet recording apparatus (IPSiO GXe-5500 available from Ricoh Co., Ltd.). The drive voltage of the piezo element was changed such that the discharge amount of the ink and the deposited amount of the ink on a recording medium became constant under an environmental condition of 23±0.5° C., 50±5% RH. The inkjet recording apparatus was allowed to print image while setting the printing mode to "Plain paper/Fast" or "Glossy paper/Slow".

Rub Resistance 1: Image Peel-Off

A solid image chart with each side having a length of 3 cm was printed on POSTER PAPER MAX available from Sakurai Co., Ltd. having a basis weight of 180 g/m² while setting the printing mode to "Glossy paper/Fast".

After being dried, the printed part was rubbed back and forth 5 times with cotton cloth. The printed part was then visually observed to check whether image peel-off had occurred or not. Rub resistance 1 was evaluated based on the following criteria.

Evaluation Criteria

A: No image peel-off was observed.

B: Slight image peel-off was observed at the end parts of the image.

C: Image peel-off was observed.

Rub Resistance 2: Fouling in Non-Printed Part

A solid image chart with each side having a length of 3 cm was printed on POSTER PAPER MAX available from Sakurai Co., Ltd. having a basis weight of 180 g/m² while setting the printing mode to "Glossy paper/Fast".

After being dried, the printed part was rubbed back and forth 5 times with cotton cloth. The non-printed part was then visually observed to check whether image stretching or fouling had occurred by image transfer. Rub resistance 2 was evaluated based on the following criteria.

Evaluation Criteria

A: No fouling was observed.

B: Slight fouling was observed.

C: Fouling was observed.

Discharge Stability

An A4-size chart including solid parts having an area ratio of 5% per color, formed with MICROSOFT WORD 2000, was continuously printed on 200 sheets of MY PAPER (available from Ricoh Co., Ltd.). Thereafter, discharge stability was evaluated based on the degree of disturbance in discharge at each nozzle. The printing mode "Plain paper/Standard/Fast" was modified to "No color correction" through the user setting for plain paper using a driver attached to the printer.

Evaluation Criteria

A: Disturbance in discharge was not observed.

B: Disturbance in discharge was slightly observed.

C: Disturbance in discharge was observed, or discharge was not performed in part.

Image Density

Image density was evaluated under the following conditions.

Printing Conditions

Printer: IPSIO GXE 5500 (available from Ricoh Co., Ltd.)

Paper: MY PAPER (available from Ricoh Co., Ltd., plain paper)

Chart: Black solid patch

Printing mode: Beautiful mode

The black solid part in the chart was subjected to a measurement of black image density with a reflective spectrodensitometer (Model 939 available from X-Rite).

TABLE 4

| | Ink Properties | | | | | | Image Forming Process Bk | | | |
|---|---|---|---|---|---|---|---|---|---|---|
| | Viscosity mPa·s | pH | Particle Diameter (D50) nm | Surface Tension mN/m | Foaming Property Foam Height (mm) | Fluidity at Moisure Evaporation | Storage Stability | Discharge Stability | Rub Resistance 1 | Rub Resistance 2 | Image Density on Plain Paper |
| Example 1 | 7.9 | 9.8 | 121 | — | — | A | A | A | B | A | — |
| Example 2 | 8.1 | 10.4 | 102 | 27.5 | 28 | A | A | B | B | B | 1.36 |
| Example 3 | 8.4 | 9.7 | 99 | 28.8 | 27 | A | B | A | B | A | 1.27 |
| Example 4 | 8.7 | 10.1 | 89 | — | — | A | B | A | A | A | — |
| Example 5 | 8.1 | 10.5 | 122 | — | — | B | B | A | A | A | — |
| Example 6 | 8.2 | 9.7 | 123 | — | — | A | B | A | B | B | — |
| Example 7 | 8.4 | 9.9 | 125 | — | — | B | B | B | A | A | — |
| Example 8 | 8.1 | 10.1 | 117 | — | — | A | B | B | A | A | — |
| Example 9 | 7.9 | 9.7 | 87 | — | — | A | A | B | B | A | — |
| Example 10 | 8.3 | 10.1 | 90 | — | — | B | A | A | B | A | — |
| Example 11 | 7.9 | 9.9 | 92 | — | — | B | A | B | B | A | — |
| Example 12 | 7.8 | 10.3 | 118 | — | — | A | A | B | B | A | — |
| Example 13 | 8.0 | 9.7 | 123 | — | — | B | B | B | A | A | — |
| Example 14 | 8.0 | 9.9 | 125 | — | — | A | B | A | A | B | — |
| Example 15 | 7.9 | 10.1 | 117 | — | — | A | B | B | B | A | — |
| Example 16 | 7.4 | 9.7 | 124 | — | — | B | A | B | A | B | — |
| Example 17 | 8.6 | 10.1 | 117 | — | — | A | B | B | A | B | — |
| Example 18 | 7.6 | 9.9 | 118 | — | — | A | A | A | B | B | — |
| Example 19 | 8.6 | 10.3 | 108 | — | — | B | B | B | A | A | — |
| Example 20 | 8.5 | 10.2 | 101 | 26.8 | 22 | A | B | A | B | A | 1.3 |
| Example 21 | 8.6 | 10.4 | 105 | 25.8 | 18 | A | B | A | B | A | 1.34 |
| Example 22 | 8.6 | 10.5 | 103 | 24 | 16 | A | B | A | B | A | 1.38 |
| Example 23 | 8.6 | 10.3 | 104 | 22.5 | 16 | A | B | A | B | A | 1.43 |
| Example 24 | 8.6 | 10.2 | 104 | 22.8 | 12 | A | B | A | B | A | 1.45 |
| Example 25 | 8.2 | 10.7 | 105 | 26 | 20 | A | A | A | B | B | 1.42 |
| Comparative Example 1 | 8.6 | 9.7 | 119 | — | — | A | A | B | C | C | — |
| Comparative Example 2 | 7.8 | 10.0 | 121 | — | — | C | A | B | A | B | — |
| Comparative Example 3 | 8.5 | 9.9 | 114 | — | — | C | B | A | A | A | — |
| Comparative Example 4 | 8.1 | 10.2 | 128 | — | — | C | B | B | B | A | — |
| Comparative Example 5 | 8.2 | 11.2 | 128 | — | — | B | C | C | A | A | — |
| Comparative Example 6 | 8.0 | 10.5 | 123 | — | — | C | B | C | A | B | — |

What is claimed is:

1. An ink, comprising:
a colorant;
an organic solvent;
a resin particle including an anionic urethane resin;
an organic amine compound having a boiling point in the range of from 120° C. to 200° C. and a molecular weight of 100 or less selected from the group consisting of piperazine, N,N-dimethylethanolamine, and 1-amino-2-methyl-propanol; and
water,
wherein a mass ratio of the resin particle to the colorant is in the range of from 0.05 to 0.8, and
wherein a mass ratio of the organic amine compound to the resin particle is in the range of from 0.01 to 1.00.

2. The ink according to claim 1, wherein the resin particle has a particle diameter (D50) in the range of from 10 to 100 nm.

3. The ink according to claim 1, wherein the resin particle has a particle diameter (D50) in the range of from 10 to 50 nm.

4. The ink according to claim 1, wherein the anionic urethane resin includes at least one of an anionic polycarbonate-based urethane resin and an anionic polyester-based urethane resin.

5. The ink according to claim 1, wherein the organic solvent accounts for 30% to 50% by mass of the ink.

6. The ink according to claim 1, wherein the colorant includes a self-dispersible colorant having a functional group.

7. The ink according to claim 1, wherein the colorant includes a resin-coated colorant.

8. The ink according to claim 1, wherein the ink has a static surface tension in the range of from 20 to 27 mN/m at 25° C.

9. The ink according to claim 1, further comprising:
a fluorine-based surfactant; and
a compound represented by formula (V):

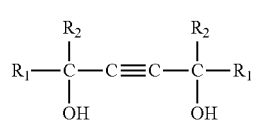

(V)

wherein each of $R_1$ and $R_2$ independently represents an alkyl group.

10. The ink according to claim 1, further comprising:
a fluorine-based surfactant; and
a compound represented by formula (VII):

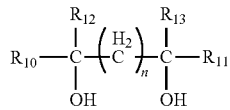

wherein:
each of $R_{10}$ and $R_{11}$ independently represents an alkyl group having 3 to 6 carbon atoms;
each of $R_{12}$ and $R_{13}$ independently represents an alkyl group having 1 to 2 carbon atoms; and
n represents an integer of from 1 to 6.

11. The ink according to claim 1, further comprising:
a fluorine-based surfactant;
a non-fluorine-based surfactant; and
a foam inhibitor.

12. The ink according to claim 1, wherein the organic amine compound is selected from the group consisting of N,N-dimethylethanolamine and 1-amino-2-methyl-propanol.

13. The ink according to claim 1, wherein
the organic solvent comprises at least one selected from the group consisting of 1,3-butanediol, 3-methyl-1,3-butanediol, glycerin, triethylene glycol, 2-ethyl-1,3-hexanediol, and 2,2,4-trimethyl-1,3-pentanediol, and
the anionic urethane resin includes at least one of an anionic polycarbonate-based urethane resin and an anionic polyester-based urethane resin.

14. An image forming method, comprising:
applying at least one stimulus selected from the group consisting of heat, pressure, and vibration to the ink according to claim 1 to fly the ink; and
recording an image on a recording medium with the ink.

15. An image formed product, comprising:
a recording medium; and
an ink image on the recording medium, the ink image including:
a colorant;
an anionic urethane resin; and
an organic amine compound having a boiling point in the range of from 120° C. to 200° C. and a molecular weight of 100 or less selected from the group consisting of piperazine, N,N-dimethylethanolamine, and 1-amino-2-methyl-propanol;
wherein a mass ratio of the resin particle to the colorant is in the range of from 0.05 to 0.8, and
wherein a mass ratio of the organic amine compound to the anionic urethane resin is in the range of from 0.01 to 1.00.

* * * * *